(12) United States Patent
Margolin

(10) Patent No.: US 10,489,032 B1
(45) Date of Patent: Nov. 26, 2019

(54) RICH STRUCTURED DATA INTERCHANGE FOR COPY-PASTE OPERATIONS

(71) Applicant: Google Inc., Mountain View, CA (US)

(72) Inventor: Benjamin Margolin, San Mateo, CA (US)

(73) Assignee: GOOGLE LLC, Mountain View, CA (US)

(*) Notice: Subject to any disclaimer, the term of this patent is extended or adjusted under 35 U.S.C. 154(b) by 611 days.

(21) Appl. No.: 14/812,677

(22) Filed: Jul. 29, 2015

(51) Int. Cl.
*G06F 3/0484* (2013.01)

(52) U.S. Cl.
CPC ...... *G06F 3/04845* (2013.01); *G06F 3/04842* (2013.01)

(58) Field of Classification Search
CPC ............. G06F 3/04845; G06F 3/04842; G06F 3/0482; G06F 9/543; G06F 3/543
See application file for complete search history.

(56) References Cited

U.S. PATENT DOCUMENTS

| | | | |
|---|---|---|---|
| 5,305,435 A | 4/1994 | Bronson | |
| 5,924,099 A | 7/1999 | Guzak et al. | |
| 6,309,305 B1 | 10/2001 | Kraft | |
| 7,950,066 B1* | 5/2011 | Zuili | G06F 21/6281 713/165 |
| 8,296,671 B2 | 10/2012 | Narayanan et al. | |
| 8,312,385 B2 | 11/2012 | Bier | |
| 8,477,109 B1 | 7/2013 | Freed | |
| 8,555,187 B2 | 10/2013 | Margolin | |
| 8,792,054 B2 | 7/2014 | Mountain | |
| 8,838,438 B2 | 9/2014 | Leary et al. | |
| 8,924,858 B2 | 12/2014 | Mistry et al. | |

(Continued)

FOREIGN PATENT DOCUMENTS

| | | |
|---|---|---|
| EP | 2143021 A1 | 1/2010 |
| EP | 2618247 A1 | 7/2013 |
| WO | 2015034826 A1 | 3/2015 |

OTHER PUBLICATIONS

Makeuseof, "5 Tips to Manage Your Windows Clipboard Like a Pro," Makeuseof, Nov. 20, 2014, Retrieved from <http://www.makeuseof.com/tag/5-tips-manage-windows-clipboard-like-pro/> 10 pp.

(Continued)

*Primary Examiner* — Justin R. Blaufeld
*Assistant Examiner* — Mong-Shune Chung
(74) *Attorney, Agent, or Firm* — Shumaker & Sieffert, P.A.

(57) ABSTRACT

An example method includes, during execution of a first application, and responsive to receiving an indication of a first event, sending, to the first application, a request to obtain data associated with graphical elements that are output by the first application for display, and receiving, from the first application, the data associated with the graphical elements, wherein the data comprises data items that each include one or more representations of the respective data item, and wherein each data item is stored in a system clipboard. The example method further includes, during execution of a second application, and responsive to receiving an indication of a second event, determining a group of data items that each satisfy at least one criterion, retrieving at least one data item of the group of data items from the system clipboard, and sending the at least one data item to the second application for output.

14 Claims, 9 Drawing Sheets

(56) References Cited

U.S. PATENT DOCUMENTS

| | | | |
|---|---|---|---|
| 9,268,733 | B1 | 2/2016 | Rachabathuni |
| 2002/0118220 | A1 | 8/2002 | Lui et al. |
| 2002/0154153 | A1 | 10/2002 | Messinger et al. |
| 2006/0036991 | A1 | 2/2006 | Biazetti et al. |
| 2009/0112832 | A1 | 4/2009 | Kandogan et al. |
| 2009/0158221 | A1 | 6/2009 | Nielsen et al. |
| 2009/0199097 | A1 | 8/2009 | Black et al. |
| 2009/0249247 | A1 | 10/2009 | Tseng et al. |
| 2011/0047506 | A1 | 2/2011 | Miller |
| 2011/0126092 | A1 | 5/2011 | Harris |
| 2011/0202515 | A1 | 8/2011 | Stiers |
| 2012/0110486 | A1* | 5/2012 | Sirpal ............ G06F 9/543 715/770 |
| 2012/0210203 | A1 | 8/2012 | Kandekar et al. |
| 2012/0233567 | A1 | 9/2012 | Brown |
| 2013/0007613 | A1 | 1/2013 | Edwards et al. |
| 2013/0246039 | A1 | 9/2013 | Duneau |
| 2013/0346347 | A1 | 12/2013 | Patterson et al. |
| 2013/0346491 | A1* | 12/2013 | Margolin ......... G06F 9/543 709/203 |
| 2014/0152541 | A1 | 6/2014 | Murarka et al. |
| 2014/0157168 | A1 | 6/2014 | Albouyeh et al. |
| 2014/0229860 | A1 | 8/2014 | Rogers et al. |
| 2015/0089363 | A1 | 3/2015 | Butin et al. |
| 2015/0121291 | A1 | 4/2015 | Scott et al. |
| 2015/0248651 | A1 | 9/2015 | Akutagawa et al. |
| 2015/0370764 | A1* | 12/2015 | Huo ................. G06F 9/44 715/239 |

OTHER PUBLICATIONS

Techotopia, "Android Broadcast Intents and Broadcast Receivers," Techotopia, Jul. 4, 2014, Retrieved from <http://www.techotopia.com/index.php/Android_Broadcast_Intents_and_Broadcast_Receivers>.

Vogella GmbH, "Android BroadcastReceiver—Tutorial," Aug. 14, 2013, Retrieved from <http://www.vogella.com/tutorials/AndroidBroadcastReceiver/article.html> 11 pp.

Aseem Kishore, "Best Free Clipboard Managers for Windows," Online Tech Tips, Dec. 4, 2014, Retrieved from <http://www.online-tech-tips.com/free-software-downloads/windows-clipboard-manage/> 12 pp.

Microsoft, "Copy and paste multiple items by using the Office Clipboard," Microsoft, Retrieved from the internet on May 18, 2015 <https://support.office.com/enus/article/Copyandpastemultipleitemsbyusingthe OfficeClipboard714a72af1ad4450f8708c2931e73ec8a#bm2> 14 pp.

Jason Fitzpatrick, "Five Best Clipboard Managers," HIVE FIVE, Jun. 21, 2009, 10 pp.

Copy Paste Software, "How to Copy and Paste More Than One Thing at a Time," Copy Paste Software, Retrieved from the internet on May 19, 2015, <http://www.copypastesoftware.net/howtocopyandpastemorethanonethingatatime/> 5 pp.

Android Developers, "Intents and Intent Filers," Android Developers, Retrieved from the internet on May 14, 2015 <http://developerandroid.com/guide/components/intentsfilters.html> 13 pp.

Dennis O'Reilly, "Two free programs enhance Windows' clipboard," CNET Magazine, Feb. 21, 2010, Retrieved from <http://www.cnet.com/howto/twofreeprogramsenhancewindowsclipboard/> 6 pp.

Damien Oh, "Two Useful iPhone Apps to Copy/Paste Text," makeuseof, Feb. 23, 2009, Retrieved from <http://www.nnakeuseof.com/tag/two-useful-apps-to-perform-copypaste-in-iphone/>, 4 pp.

Maketecheasier, "Making Good Use of 'Paste Special' in Office Suite," Uqnic Network Pte Ltd., Make Tech Easier, May 7, 2013, Retrieved from <https://www.maketecheasier.com/making-good-use-of-paste-special-in-office-suite/>, 10 pp.

* cited by examiner

RICH STRUCTURED DATA INTERCHANGE FOR COPY-PASTE OPERATIONS

BACKGROUND

Computing devices, such as mobile devices and/or desktop devices, typically execute various applications over a period of time. In many instances, these applications are capable of sharing or otherwise exchanging data via one or more application programming interfaces (API's) during execution. In some cases, rather than sharing or exchanging data directly with each other, these applications may store data to or retrieve data from a system clipboard. In these cases, applications may effectively be capable of indirectly exchanging data, even if these applications are not executing at the same time.

For example, during execution of a word processing application, and in response to a user request to perform a copy operation, the word processing application may copy selected data that is currently visible on a display screen to a system clipboard. At a later point in time, during execution of a spreadsheet application, and in response to a user request to perform a paste operation, the spreadsheet application may paste the previously copied data from the system clipboard into one or more cells of a spreadsheet that is currently visible on the display screen. The paste operation may be performed even if the word processing application is no longer an executing process, because the data is retrieved from the system clipboard rather than directly from the word processing application.

SUMMARY

In one example, a method includes, during execution of a first application on a computing device, and responsive to receiving an indication of a first event to initiate a copy operation associated with a system clipboard, sending, to the first application, a request to obtain data associated with one or more graphical elements that are output by the first application for display, and responsive to sending the request to the first application, receiving, from the first application, the data associated with the one or more graphical elements, wherein the data comprises a plurality of data items, wherein each data item of the plurality of data items includes one or more representations of the respective data item, and wherein each data item of the plurality of data items is stored in the system clipboard. The example method further includes, during execution of a second application on the computing device, and responsive to receiving an indication of a second event to initiate a paste operation associated with the system clipboard, determining, from the plurality of data items, a group of data items that each satisfy at least one criterion for the paste operation specified by the second application. The example method further includes retrieving at least one data item of the group of data items from the system clipboard, and sending the at least one data item to the second application for output.

In another example, a computer-readable storage medium is encoded with instructions that, when executed, cause at least one processor to perform operations comprising, during execution of a first application, and responsive to receiving an indication of a first event to initiate a copy operation associated with a system clipboard, sending, to the first application, a request to obtain data associated with one or more graphical elements that are output by the first application for display, and, responsive to sending the request to the first application, receiving, from the first application, the data associated with the one or more graphical elements, wherein the data comprises a plurality of data items, wherein each data item of the plurality of data items includes one or more representations of the respective data item, and wherein each data item of the plurality of data items is stored in the system clipboard. The example operations further include, during execution of a second application, and responsive to receiving an indication of a second event to initiate a paste operation associated with the system clipboard, determining, from the plurality of data items, a group of data items that each satisfy at least one criterion for the paste operation specified by the second application, retrieving at least one data item of the group of data items from the system clipboard, and sending the at least one data item to the second application for output.

In another example, a computing device includes at least one processor, at least one storage device communicatively coupled to the at least one processor, wherein the at least one storage device is configured to store a system clipboard, and a presence-sensitive display device communicatively coupled to the at least one processor and to the at least one storage device. The at least one processor is configured to, during execution of a first application, and responsive to receiving an indication of a first event to initiate a copy operation associated with the system clipboard, send, to the first application, a request to obtain data associated with one or more graphical elements that are output by the first application for display at the presence-sensitive display device, and, responsive to sending the request to the first application, receive, from the first application, the data associated with the one or more graphical elements, wherein the data comprises a plurality of data items, wherein each data item of the plurality of data items includes one or more representations of the respective data item, and wherein each data item of the plurality of data items is stored in the system clipboard. The at least one processor is configured to, during execution of a second application, and responsive to receiving an indication of a second event to initiate a paste operation associated with the system clipboard, determine, from the plurality of data items, a group of data items that each satisfy at least one criterion for the paste operation specified by the second application, retrieve at least one data item of the group of data items from the system clipboard, and send the at least one data item to the second application for output at the presence-sensitive display device.

The details of one or more examples are set forth in the accompanying drawings and the description below. Other features, objects, and advantages of the disclosure will be apparent from the description and drawings, and from the claims.

DETAILED DESCRIPTION

Figure 1:
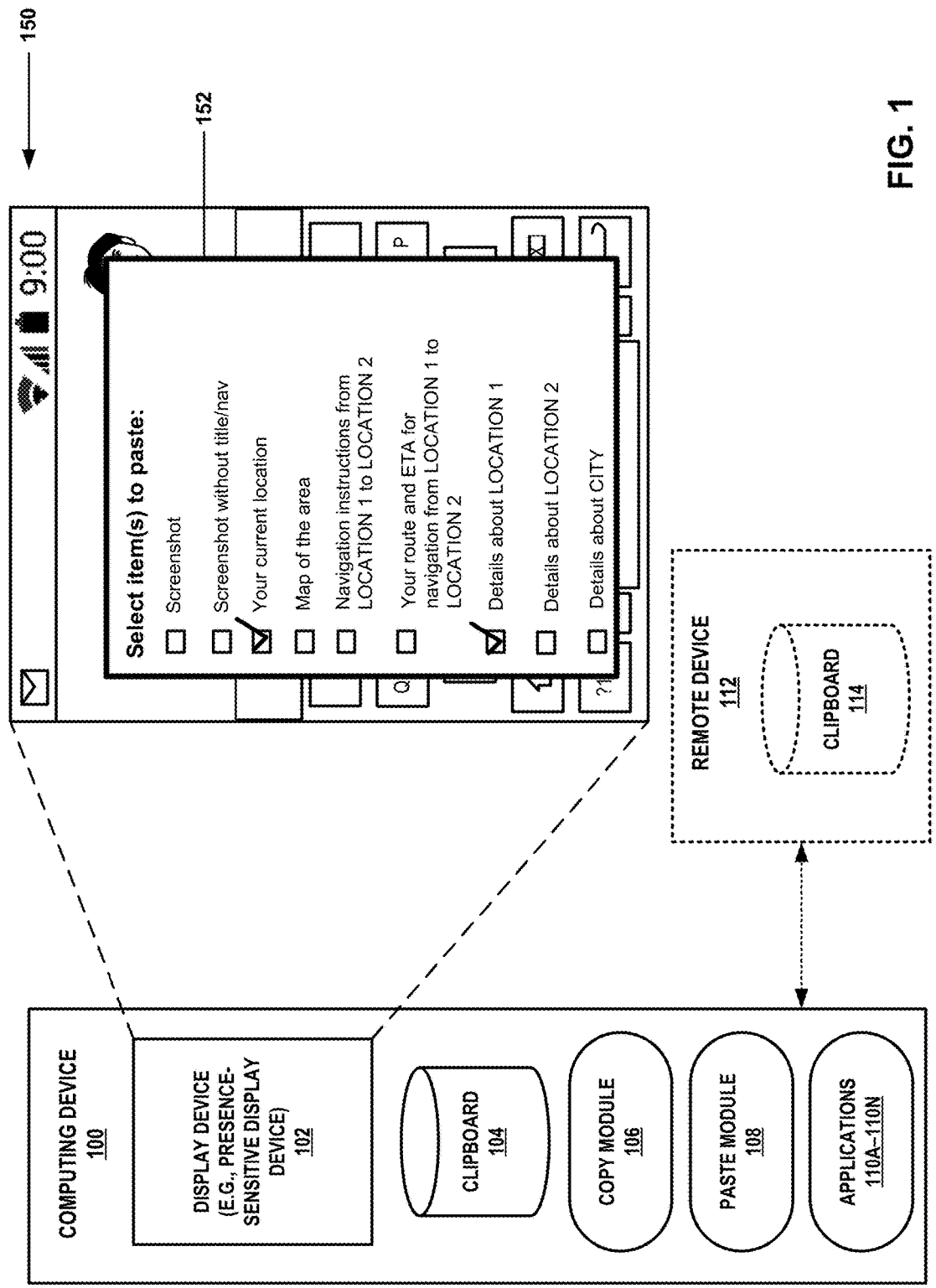
FIG. 1 is a conceptual diagram illustrating an example computing device that is configured to perform data interchange operations, such as copy and paste operations, in accordance with one or more aspects of the present disclosure.

Examples described in this disclosure relate to techniques for providing a rich structured data interchange for copy-paste operations using a system clipboard, where the system clipboard may be stored either locally to a computing device or remote from the computing device. Linking or copying-pasting information between applications, particularly between applications executing on a mobile computing device, can at times be difficult, especially when screen sizes and/or graphical user interfaces are limited in size. In some instances, even closely associated information may not always be presented closely together in a visual manner, which prevents contiguous selections from being meaningful or concise. The techniques of the present disclosure provide capabilities for rich sharing of data between applications through the use of a system clipboard.

Typical platforms, including mobile platforms, provide an interface (e.g., button or button sequence) to take a screen capture, or screenshot, of information currently displayed on a screen. In one or more examples, the techniques described herein leverage and/or enhance this functionality to provide much richer interchange functionality. Instead of simply capturing an image, the system may send a request to one or more applications (e.g., foregrounded applications) to request rich metadata representations of data items that are associated with objects or graphical elements currently being output for display. These requested representations typically include information that is displayed, but, in some cases, they may include certain off-screen information, as well. This metadata is then stored in a structured, system clipboard.

During execution of a particular application, upon receiving an indication (e.g., an indication triggered by user input) to perform a paste operation, the system may retrieve the previously stored data from the clipboard and provide it to the particular application for use, thereby facilitating a much richer interchange of data, given that the clipboard is capable of storing structured data and not simply images. The receiving application may specify formats (e.g., via Multi-purpose Internet Mail Extension, or MIME, types) that it supports, which may allow the system to output a filtered list of selectable items for display to a user. The user may select one or more items from the list that are to be provided to the receiving application during a paste operation.

Throughout the disclosure, examples are described wherein a computing device and/or computing system may analyze information associated with the computing device and information associated with the user of the computing device only if the computing device and/or the computing system receives explicit permission from the user of the computing device to analyze the information. For example, in situations discussed below in which the computing device and/or computing system may collect or may make use of information associated with the user and the computing device, the user may be provided with an opportunity to provide input to control whether programs or features of the computing device and/or computing system can collect and make use of user information (e.g., information about a user's e-mail, a user's social network, a user's preferences, or a user's calendar), or to dictate whether and/or how the computing device and/or computing system may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, zip code, or state level), so that a particular location of a user cannot be determined. Thus, the user may have control over how information is collected about the user and used by the computing device and/or computing system (e.g., by determining when copy or paste operations are performed, by determining or controlling which information is copied or pasted during such operations).

FIG. 1 is a conceptual diagram illustrating an example computing device 100 that is configured to perform data interchange operations, such as copy and paste operations, in accordance with one or more aspects of the present disclosure. Examples of computing device 100 may include, but are not limited to, a mobile phone, a tablet computer, a personal digital assistant (PDA), a laptop computer, a portable gaming device, a portable media player, an e-book reader, a wearable computing device (e.g., a watch, a wrist-mounted computing device, a head-mounted computing device), a television platform, or other type of computing device. As will be described in further detail below, computing device 100 may be or include one or more processors.

As shown in FIG. 1, computing device 100 includes a display device 102 (e.g., a presence-sensitive display device). Display device 102 may have an input component and/or an output component. For instance, display device 102 include a presence-sensitive input component, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive technology. Display device 102 may include a display component, such as a liquid crystal display (LCD), dot matrix display, light emitting diode (LED) display, cathode-ray tube (CRT) display, organic light-emitting diode (OLED) display, e-ink, projector, or similar monochrome or color display capable of outputting information to a user of computing device 100.

As one example, display device 102 of computing device 100 may comprise a presence-sensitive display device, such as a touchscreen, that includes an input component and an output component. Display device 102 may receive indications of tactile input by detecting one or more gestures from a user of computing device 100 (e.g., the user touching or pointing to one or more locations of display device 102 with a finger or a stylus pen). Display device 102 may present output in a graphical user interface, which may be associated with functionality provided by computing device 100. For example, display device 102 may present various graphical user interfaces of applications 110A-110N (collectively, "applications 110") executing at computing device 100. A user may interact with a respective graphical user interface of each of applications 24 to cause computing device 100 to perform operations relating to corresponding application functionality.

In some examples, computing device 100 may include one or more communication units, which may send data to and/or receive data from one or more other computing devices (e.g., remote device 112 illustrated in FIG. 1). In some examples, these communication units support wireless and/or wired communication and may send and/or receive data using any variety of communication protocols.

Computing device 100 may also include copy module 106, paste module 108, and system clipboard 104. Copy module 106, paste module 108, and applications 110 may perform operations described herein using software, hardware, firmware, or a mixture of hardware, software, and firmware residing in and/or executing at computing device 100. Computing device 100 may execute copy module 106, paste module 108, and applications 110 using one or more processors. Copy module 106, paste module 108, and applications 110 may be implemented in various ways. For example, applications 110 may be implemented as downloadable or pre-installed applications or "apps." Copy module 106 and/or paste module 108 may also, in some examples, execute as a service of an operating system or computing platform.

Applications 110 of computing device 100 may perform various functions or access one or more services for computing device 100. An e-mail application, a map or navigation application, a calendar application, a messaging application, a social media application, a travel application, a game application, a stock application, and a weather application are all examples of applications 110. Display device 102 may present a graphical user interface (GUI) to a user, such as GUI 150. The GUI may include graphical elements (e.g., indications) displayed at various locations of display device 102.

As will be described in further detail below, computing device 100 may utilize copy module 106 and paste module 108 to perform one or more copy operations and one or more paste operations, respectively. When performing these operations, computing device 100 may store data to and retrieve data from clipboard 104, which may be stored on computing device 100. In some cases, computing device 100 may optionally store data to and retrieve data from clipboard 114, which is stored on a remote device 112 that is external to and separate from computing device 100. In these cases, computing device 100 may use clipboard 114 in combination with or in lieu of clipboard 104. Computing device 100 may communicate with remote device 112 via one or more network connections, such as one or more wired and/or wireless connections.

In some examples, the contents of clipboard 104 and/or clipboard 114 are directly accessible only by copy module 106 and paste module 108. In these non-limiting examples, applications 110 do not have direct accessibility to clipboard 104 and/or clipboard 114, but instead only have indirect accessibility via copy module 106 and/or paste module 108 during copy operations and paste operations, respectively, which are initiated via user request. In these examples, limiting direct accessibility to clipboard 104 and/or clipboard 114 in such fashion may provide added security and control over the contents of clipboard context. In various other examples, the contents of clipboard 104 and/or clipboard 114 are directly accessible by copy module 106, paste module 108, and applications 110.

In some examples, as will be described in more detail below, during execution of a first application of applications 110 on computing device 100, and responsive to receiving an indication of a first event to initiate a copy operation associated with a system clipboard (e.g., clipboard 104), copy module 106 may send, to the first application, a request to obtain data associated with one or more graphical elements that are output for display by the first application. For example, the first application may be application 110A and the system clipboard may be clipboard 104 illustrated in FIG. 1. If application 110A is a navigation application, the graphical elements output for display by application 110A may a graphical map that includes one or more locations (e.g., current location, destination location), navigation instructions, route information, location information, and the like.

In this example, responsive to sending the request to application 110A, copy module 106 may receive, from application 110A, the data associated with the one or more graphical elements, wherein the data comprises a plurality of data items. Each data item of the plurality of data items includes one or more representations of the respective data item, and each data item of the plurality of data items is also stored in clipboard 104. In some cases, screen display information (e.g., a screenshot bitmap representation) may also be stored by copy module 106 in clipboard 104 during the copy operation. In some examples, rather than sending the data items to copy module 106, application 110A may store the data items directly in clipboard 104. In certain examples, the functionality of copy module 106 is included in one or more of applications 110, such as application 110A and/or application 110B.

During execution of a second application 110B on computing device 100, which may or may not occur during execution application 110A, and responsive to receiving an indication of a second event to initiate a paste operation associated with clipboard 104, paste module 108 may determine, from the plurality of data items, a group of one or more data items that each satisfy at least one criterion for the paste operation specified by application 110B. In some cases, application 110B may execute in parallel with application 110A. However, in other cases, application 110B may execute after application 110A has terminated execution. Application 110A and application 110B may nevertheless indirectly exchange data via clipboard 104, regardless of whether or not they execute in parallel.

In the example of FIG. 1, application 110B may comprise a messaging application (e.g., instant messenger) that outputs information in GUI 150 to the user. Application 110B may output a graphical element comprising a menu 152 that includes a selectable group of elements corresponding to data items that may be pasted during a paste operation. Each of these data items satisfy at least one criterion for the paste operation specified by application 110B. For example, application 110B may indicate that it supports paste operations for data representations of certain data types only. These data types may include data types for bitmap data, plain text data, and/or text data with links (e.g., Uniform Resource Location, or URL, links). In some cases, application 110B may indicate supported data types or formats by specifying one or more MIME types.

In the example of FIG. 1, textual descriptions of the group of one or more data items that each satisfy the at least one criterion for the paste operation are included for display in menu 152. One or more of these data items may be selected for the paste operation, such as by a user of computing device 100. As shown in FIG. 1, a user has selected the data items for "Your current location" and "Details about LOCATION 1." The first selected data item has a textual description of "Your current location," and the second selected item has a textual description of "Details about LOCATION 1." Responsive to the selection, paste module 108 retrieves the corresponding data items from clipboard 104 and sends them to application 110B for display. In some cases, paste module 108 may send all representations of a given data item that are stored in clipboard 104 and allow application 110B to select and/or choose which one(s) of data item representations to output for display. For example, if clipboard 104 includes multiple different representations of the data item having the description "Your current location" (e.g., regular text, text with links), paste module 108 may provide these multiple different representations to application 110B, and application 110B may select which one(s) of these representations to output for display at a particular time (e.g., given the current state of application 110B). In some examples, rather than obtaining data items from paste module 108, application 110B may directly obtain the data items from clipboard 104. In certain examples, the functionality of paste module 108 is included in one or more of applications 110, such as application 110A and/or application 110B.

Typically, application 110A, which is associated with the copy operation, and application 110B, which is associated with the paste operation, are different applications. However, in some cases, these applications may be the same application (e.g., when copying information from and pasting information into a GUI that is output for display by the same application).

Various examples described herein may allow for the interchange of rich, structured data between applications executing on a computing device (e.g., mobile device), such as during copy and paste operations. In various examples, during execution of a particular application, upon receiving an indication (e.g., an indication triggered by user input) to perform a paste operation, paste module 108 may retrieve the previously stored data from the clipboard and provide it to the particular application for use, thereby facilitating a much richer interchange of data, given that the clipboard (e.g., clipboard 104) is capable of storing structured data. The particular application may specify formats that it supports for paste operations, and paste module 108 is able to output a filtered list of selectable items for display to a user. The user may select one or more items from the list that are to be provided to the receiving application during a paste operation.

As a result, the user may have specific control over which one or more items are pasted during any given paste operation, which may lead to greater user satisfaction. Because menu 152 includes an itemized description of each possible data item that may be selected for a given paste operation, paste module 108 may provide added consistency and reliability during the performance of paste operations, as the user is provided with detailed information about each selectable option in menu 152. In various non-limiting examples, copy module 106 and paste module 108 are operable to control the flow of data into and out of the clipboard 104 and/or clipboard 114, while providing events associated with copy operations and paste operations to applications 110. In these examples, applications 110 may wait to receive events associated with these copy operations and paste operations from copy module 106 and paste module 108, respectively. In such fashion, the security of clipboard 104 and/or clipboard 114 may be improved in these non-limiting examples, because access to clipboard content is limited only to copy module 106 and paste module 108. In addition, in certain cases, copy module 106 and paste module 108 may utilize a standard format of data for clipboard content, as will be described in further detail below in reference to FIG. 3.

In some cases, a user may trigger a given copy or paste operation by providing input to one or more of input components provided by computing device 100. For example, the user may provide a first tactile and/or audio input to first trigger a copy operation, and may subsequently provide a second tactile and/or audio input to trigger a past operation. In some cases, the input to trigger a copy operation may be the same input that is used to trigger a screen capture (e.g., screenshot) operation. However, rather than merely performing a screen capture operation, copy module 106 is capable of performing a more sophisticated copy operation that allows for the capture of multiple representations of data items that are stored in the system clipboard (e.g., clipboard 104). Copy module 106 may obtain one or more representations of one or more different data items provided by one or more of applications 110. In various cases, copy module 106 may obtain such information from multiple different ones of application 110, where all of such information may be utilized by paste module 108 during a paste operation. In such fashion, copy module 106 and paste module 108 allow for the rich interchange of multiple data items between applications 110, triggered by straightforward input mechanisms provided by the user. In addition, computing device 100 is capable of storing data to and retrieving data from a clipboard stored locally (e.g., clipboard 104) and/or a clipboard stored remotely (e.g., clipboard 114).

Figure 2:
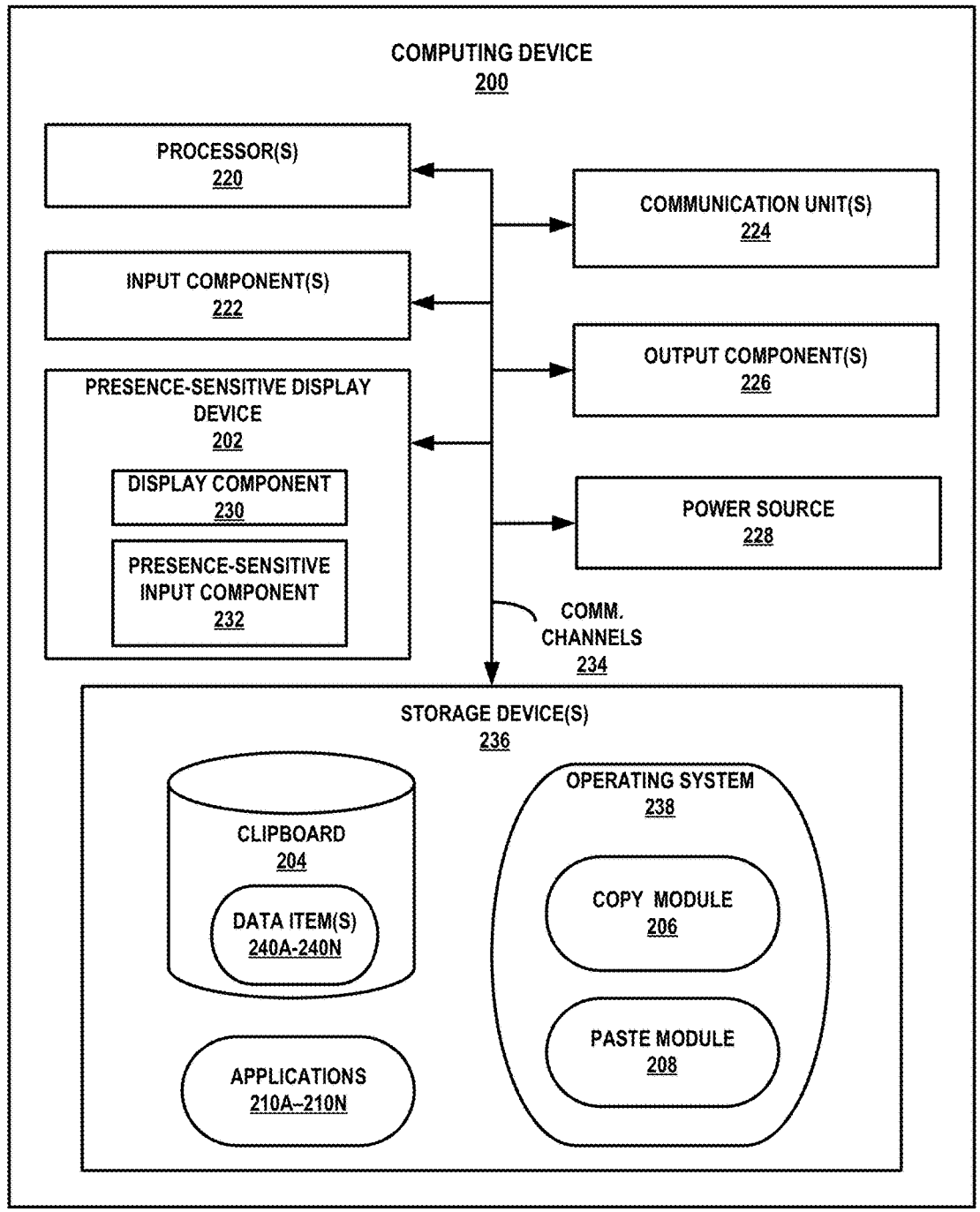
FIG. 2 is a block diagram illustrating an example of the computing device illustrated in FIG. 1, in accordance with one or more aspects of the present disclosure.

FIG. 2 is a block diagram illustrating an example computing device 200, in accordance with one or more aspects of the present disclosure. Computing device 200 may comprise one example of computing device 100 illustrated in FIG. 1. FIG. 2 illustrates only one particular example of computing device 200, and many other examples of computing device 200 may be used in other instances and may include a subset of the components included in example computing device 200 or may include additional components not shown in FIG. 2.

In the example of FIG. 2, computing device 200 includes presence-sensitive display device 202, one or more processors 220, one or more input components 222, one or more communication units 224, one or more output components 226, a power source 228, and one or more storage devices 236. Storage devices 236 of computing device 200 include clipboard 204 (which may be one example of clipboard 104 shown in FIG. 1), applications 210A-210N (collectively, "applications 210," which may be one example of applications 110 shown in FIG. 1), operating system 238, copy module 206 (which may be one example of copy module 106 shown in FIG. 1), and paste module 208 (which may be one example of paste module 108 shown in FIG. 1). Communication channels 234 may interconnect each of the components 220, 222, 202, 236, 228, 226, and/or 224 for inter-component communications (physically, communicatively, and/or operatively). In some examples, communication channels 234 may include a system bus, a network connection, an inter-process communication data structure, or any other method for communicating data between hardware and/or software.

One or more input components 222 of computing device 200 may receive input, such as input from a user. Examples of input are tactile, audio, and video input. Examples of input components 222 include a presence-sensitive screen, touch-sensitive screen, touchscreen, mouse, keyboard, trackpad, voice responsive system, video camera, microphone or any other type of device for detecting input from a human or machine.

One or more output components 226 of computing device 200 may generate output. Examples of output are tactile, audio, and video output. Examples of output components 226 include a presence-sensitive screen, touch-sensitive screen, touchscreen, sound card, video graphics adapter card, speaker, cathode ray tube (CRT) display, liquid crystal display (LCD), or any other type of device for generating output to a human or machine.

One or more communication units 224 of computing device 200 may communicate with external devices via one or more networks by transmitting and/or receiving network signals on the one or more networks (e.g., one or more wired and/or wireless networks). For example, computing device 200 may use communication units 224 to transmit and/or receive radio signals on a radio network such as a cellular radio network. Likewise, communication units 224 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 224 may include short wave radios, cellular data radios, wireless Ethernet network radios, as well as universal serial bus (USB) controllers. In some examples, computing device 200 may use communication units 224 to communicate with remote device 112 illustrated in FIG. 1.

Presence-sensitive display device 202 of computing device 200 includes display component 230 and presence-sensitive input component 232. In some examples, presence-sensitive display device 202 may provide output to a user using tactile, audio, or video stimuli as described above with reference to output components 226. For example, display component 230 may provide display or video output as described with reference to output components 226. Presence-sensitive display device 202 may also provide input capabilities such as that described above with reference to input components 222. For example, presence-sensitive input component 232 may provide input capabilities as described with reference to input components 222.

Display component 230 may be a screen at which information is displayed by presence-sensitive display device 202, and presence-sensitive input component 232 may detect an object at and/or near display component 230. As one example range, presence-sensitive input component 232 may detect an object, such as a finger or stylus that is within two inches or less of display component 230. Presence-sensitive input component 232 may determine a location (e.g., an (x,y) coordinate) of display component 230 at which the object was detected. In another example range, presence-sensitive input component 232 may detect an object six inches or less from display component 230 and other ranges are also possible. Presence-sensitive input component 232 may determine the location of display component 230 selected by a user's finger using capacitive, inductive, and/or optical recognition techniques. In some examples, presence sensitive input component 232 also provides output to a user using tactile, audio, or video stimuli as described with respect to display component 230. Display component 230 may be any type of output device that provides visual output, such as described with respect to output components 226. In the example of FIG. 2, presence-sensitive display device 202 presents a graphical user interface (such as GUI 150 shown in FIG. 1).

While illustrated as an internal component of computing device 200, presence-sensitive display device 202 may also represent an external component that shares a data path with computing device 200 for transmitting and/or receiving input and output. For instance, in one example, presence-sensitive display device 202 represents a built-in component of computing device 200 located within and physically connected to the external packaging of computing device 200 (e.g., a screen on a mobile phone). In another example, presence-sensitive display device 202 represents an external component of computing device 200 located outside and physically separated from the packaging of computing device 200 (e.g., a monitor and/or a projector that shares a wired and/or wireless data path with a tablet computer).

Presence-sensitive display device 202 of computing device 200 may detect two-dimensional and/or three-dimensional gestures as input from a user of computing device 200. For instance, a sensor of presence-sensitive display device 202 (e.g., sensor of presence-sensitive input component 232) may detect a user's movement (e.g., moving a hand, an arm, a pen, a stylus) within a threshold distance of the sensor of presence-sensitive display device 202. Presence-sensitive display device 202 may determine a two or three dimensional vector representation of the movement and correlate the vector representation to a gesture input (e.g., a hand-wave, a pinch, a clap, a pen stroke) that has multiple dimensions. In other words, presence-sensitive display device 202 can detect a multi-dimension gesture without requiring the user to gesture at or near a screen or surface (e.g., display component 230) at which presence-sensitive display device 202 outputs information for display. Instead, presence-sensitive display device 202 can detect a multi-dimensional gesture performed at or near a sensor which may or may not be located near the screen or surface at which presence-sensitive display device 202 outputs information for display.

One or more storage devices 236 within computing device 200 may store information for processing during operation of computing device 200 (e.g., during execution of one or more applications 210, operating system 238, copy module 206, and/or paste module 208). In some examples, storage devices 236 include temporary memory, meaning that a primary purpose of storage devices 236 is not long-term storage. Storage devices 236 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 236, in some examples, include one or more computer-readable storage media. Storage devices 236 may be configured to store larger amounts of information than volatile memory. Storage devices 236 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 236 may store program instructions and/or data associated with clipboard 204, applications 210, operating system 238, copy module 206, and/or paste module 208.

As shown in FIG. 2, computing device 200 may include a power source 228. In some examples, power source 228 may be a battery. Power source 228 may provide power to one or more components of computing device 2. Non-limiting examples of power source 228 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 228 may have a limited capacity (e.g., 1000-3000 mAh).

One or more processors 220 may implement functionality and/or execute instructions within computing device 200. For example, processors 220 on computing device 200 may receive and execute instructions stored by storage devices 236 that execute the functionality of applications 210, operating system 238, copy module 206, and/or paste module 208. These instructions executed by processors 220 may cause computing device 200 to store information within storage devices 236 during program execution. Processors 220 may execute instructions of operating system 238 and applications 210 to perform one or more operations. That is, operating system 238 and applications 210 may be operable by processors 220 to perform various functions described herein.

In some alternate examples, computing device 200 may only comprise or otherwise include processors 220. In these examples, input components 222, presence-sensitive display device 202, communication units 224, output components 226, power source 228, and storage devices 236 may be external to, yet communicatively coupled with (e.g., via communication channels 234), computing device 200.

In the example of FIG. 2, copy module 206 and paste module 208 are illustrated as being part of, or implemented by, operating system 238. In some other examples, however, functionality described herein in reference to copy module 206 and/or paste module 208 may be implemented separately from or outside of operating system 238, such as in separate processes/threads or as part of one or more of applications 210.

Applications 210 may include one or more different various applications. An e-mail application, a map or navigation application, calendar application, a messaging application, a social media application, a travel application, a game application, a stock application, and a weather application are all examples of applications 210. In accordance with aspects of this disclosure, one or more of applications 210 area capable of indicating (e.g., to operating system 238 and/or copy module 206) that they are capable of providing rich data for copy operations.

Copy module 206 is capable of sending individual requests (e.g., via a respective application programming interface, or API) to each of applications 210 that provide such support, requesting data associated with one or more graphical elements that are output for display by the respective application. Copy module 206 may send these requests responsive to receiving an indication of an event to initiate a copy operation. This event may be a user-initiated event, such as an event associated with one or more of input components 222 (e.g., tactile activation of one or more keys/buttons, audio activation).

Each of applications 210 that received such a request may provide, to copy module 206 (e.g., via the respective API between the application and copy module 206), zero or more data items that are associated with the graphical elements output for display by the respective application, although the data items do not necessarily include data that is actively displayed by the application, as will be described later below. Each data item includes one or more representations of the respective data item, and may also include a plaintext description of the item. Copy module 206 stores the received data items from applications 210 in clipboard 204 as data items 240A-240N (collectively, "data items 240"). In some cases, copy module 206 may store data items 240 in a clipboard that is external to computing device 200 (e.g., in clipboard 114 shown in FIG. 1). In these cases, copy module 206 may store data items 240 in each of clipboard 204 and the external clipboard, only in clipboard 204, or only in the external clipboard. In some examples, in responsive to receiving the request from copy module 206, rather than sending the data items to copy module 206, application 210 may store the data items directly in clipboard 204. In certain examples, the functionality of copy module 206 is included in one or more of applications 210.

After data items 240 have been stored in clipboard 240, paste module 208 may perform one or more paste operations. During execution of one of applications 210, such as application 210B, paste module 208 may receive an indication of an event to initiate a paste operation. This event may be a user-initiated event, such as an event associated with one or more of input components 222 (e.g., tactile activation of one or more keys/buttons, audio activation). Upon receiving the indication of this event, paste module 208 is capable of sending application 210B (e.g., via a respective API between application 210B and paste module 208) a request to obtain at least one criterion for the paste operation, and, responsive to sending the request, receiving, from application 210B, the at least one criterion for the paste operation. For example, the at least one criterion may be an indication of one or more data types of data items and/or representations are supported by application 210B for the paste operation.

Based upon the at least one criterion, paste module 208 may identify a filtered group of one or more data items from data items 240 in clipboard 204 that each satisfy the at least one criterion, such as by determining whether the respective one or more representations for a given data item are associated with at least one data type that matches the one or more data types supported by application 210B for the paste operation. As one non-limiting example, application 210B may indicate that it supports (e.g., via MIME type indication) paste operations for bitmap data and plain text data only. Paste module 208 may identify the filtered group of data items based on which data items and/or representations of these data items contain bitmap data and/or plain text data.

Figure 6:
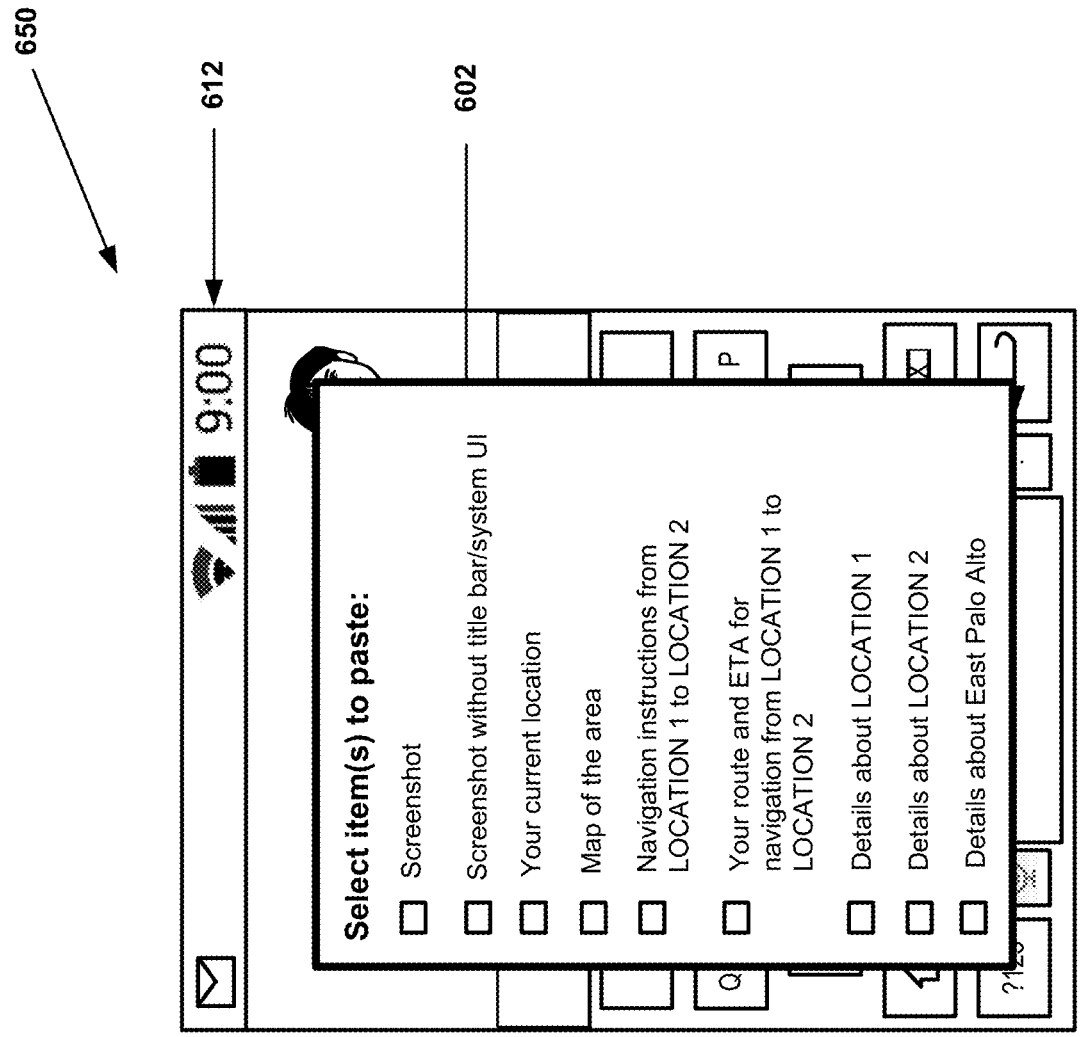
FIG. 6 is a screen diagram illustrating examples of data items and/or representations of data items that may be pasted during a paste operation, in accordance with one or more aspects of the present disclosure.
Figure 7:
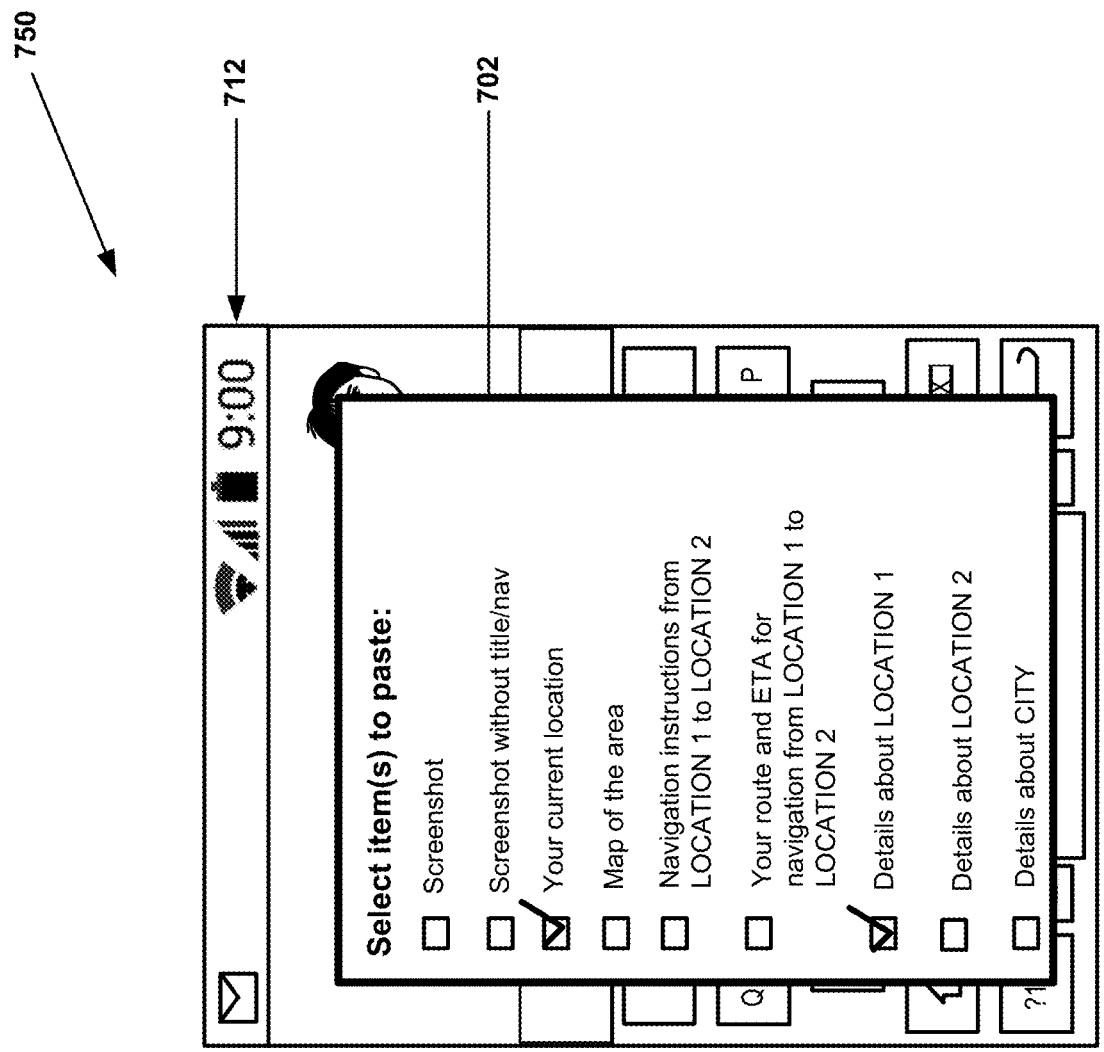
FIG. 7 is a screen diagram illustrating example selections of data items and/or representations of data items illustrated in FIG. 6, in accordance with one or more aspects of the present disclosure.

Based on the filtered group of data items, paste module 208 may output, for display (e.g., using presence-sensitive display device 202) a group of selectable elements, where each selectable element in the group of selectable elements corresponds to a respective data item in the filtered group of data items, such as shown in the example of FIG. 6. A description of each data item and/or representation may be provided. Paste module 208 may receive an indication of a user-selection of at least one selectable data element from the group of selectable elements, such as shown in the example of FIG. 7. In various examples, the user may select multiple ones of the selectable elements for the paste operation, as illustrated in FIG. 7. In other instances in which paste module 208 has identified only one data item in the filtered group of data items, paste module 208 may, in certain examples, refrain from outputting the group of selectable elements (which comprises a group of one element), and may automatically select this one data item for the paste operation.

Upon receiving a selection of at least data item from the filtered group of data items output for display to the user, paste module 208 may retrieve this at least one data item from data items 240 stored in clipboard 204, and send the at least one data item to application 210B for processing (e.g., for display in a GUI by application 210B). In some examples, rather than obtaining data items from paste module 208, application 210B may directly obtain the data items from clipboard 104. In certain examples, the functionality of paste module 208 is included in one or more of applications 210, such as application 210B.

The techniques described herein associated with copy operations may be implemented for multiple applications. For example, if multiple ones of applications 210 are currently executing on computing device 200, upon initiation of a copy operation (e.g., based upon a user-initiated event), each of these applications may provide one or more data items to copy module 206 upon request. Each of these data items may be included in data items 240 stored in clipboard 204 by copy module 206. Consequently, any of these data items 240 may subsequently be retrieved by paste module 208 during a paste operation and provided to one of applications 210 (e.g., application 210B).

The described techniques may provide a mechanism by which to copy multiple data items 240 into clipboard 204 during a given copy operation, where each one of the data items may include one or more representations of the respective item. As one non-limiting example, and as will be described in further detail below, if application 210A is a navigation application that is currently outputting various graphical elements in a GUI for display, upon detection of a particular event to trigger a copy operation, copy module 206 may request data items from application 210A, and application 210A may provide multiple different data items to copy module 206, such as a current location of computing device 200, a map of a given area, navigation instructions from a first location to a second location, and others. Each data item may include one or more representations of the respective data item. For instance, the data item for a current location of computing device 200 may include a textual representation of the current location and/or a linked text representation (e.g., text data with links) of the current location. The data item for the map may include a bitmap representation of the map. All of this information may be stored in data items 240 of clipboard 204 for later use during a paste operation. In addition, copy module 206 is also capable of separately obtaining and storing a screen display (e.g., screenshot) of the current information output for display in a GUI as one of the data items 240 stored in clipboard 204. This particular data item may have a bitmap representation, in some examples.

The described techniques allow copy module 206 to store multiple data items into clipboard 204 during a single copy operation, and also allow paste module 208 to paste multiple data items during a single paste operation. As another non-limiting example, application 210C may be a calendar application. With the described techniques, a user may initiate a single copy operation to copy data items associated with multiple different calendar events currently output for display on the screen at the same time, and store these data items in clipboard 204 (e.g., as rich calendar objects), each of which may be utilized during a single paste operation. In addition, if the calendar events also had attachments, such as agenda documents, links to those attachments could also be included as individual data items provided by application 210C and stored in data items 240 by copy module 206 during the copy operation. Free/busy times for the specified days could also be copied into data items 240 (e.g., as text). In addition, diagnostic information about the state of application 210A could also be copied into data items 240 during the copy operation. In this way, a collection of different data items, each with potentially multiple representations, can be provided by one or more of applications 210 and stored by copy module 206 in data items 240 of clipboard 204. While data items 240 may be associated with graphical elements that are output for display by an application, one or more of these data items 240 and/or respective representations may include content that is not currently output for display (e.g., information about attachments, diagnostic information in the example above).

Accordingly, using one or more techniques of the present disclosure, there may not necessarily be a need for individual copy operations for every individual graphical element, screen, output interface, and the like. Instead, a single copy operation may be used by copy module 206 to store various different data items associated generally with graphical elements or content output for display by one or more of applications 210 in clipboard 204. In some cases, a user may initiate such a copy operation by providing audio or tactile feedback. For instance, the user may press one or more buttons (e.g., included in or otherwise provided by input components 222, such as a "power" and/or "volume down" button) provided by computing device 200 to initiate a copy operation. In various examples, rather than a user having to provide multiple inputs to perform multiple different copy operations in order to copy different items to the clipboard, the user may provide a single input to perform a single copy operation that results in the copying of potentially multiple different items from potentially multiple different applications to the clipboard.

In some instances, this may comprise the same user input utilized to trigger a screenshot operation. However, rather than merely performing a screenshot operation, which captures a bitmap of the entire screen or GUI that is currently being output for display by computing device 200 (e.g., at presence-sensitive display device 202), this user input may trigger copy module 206 to perform the copy operation described above. Copy module 206 may, in fact, capture a screenshot and store the bitmap representation as one of data items 240 in clipboard 204. In addition, however, copy module 206 may collect one or more rich data items from one or more of applications 210, and store these data items within data items 240 of clipboard 204. Similarly, the user may initiate a paste operation by providing audio or tactile feedback. As one non-limiting example, the user may press one or more buttons provided by computing device 200 (e.g., a "power" and/or "volume up" button) to perform a paste operation.

Figure 3:
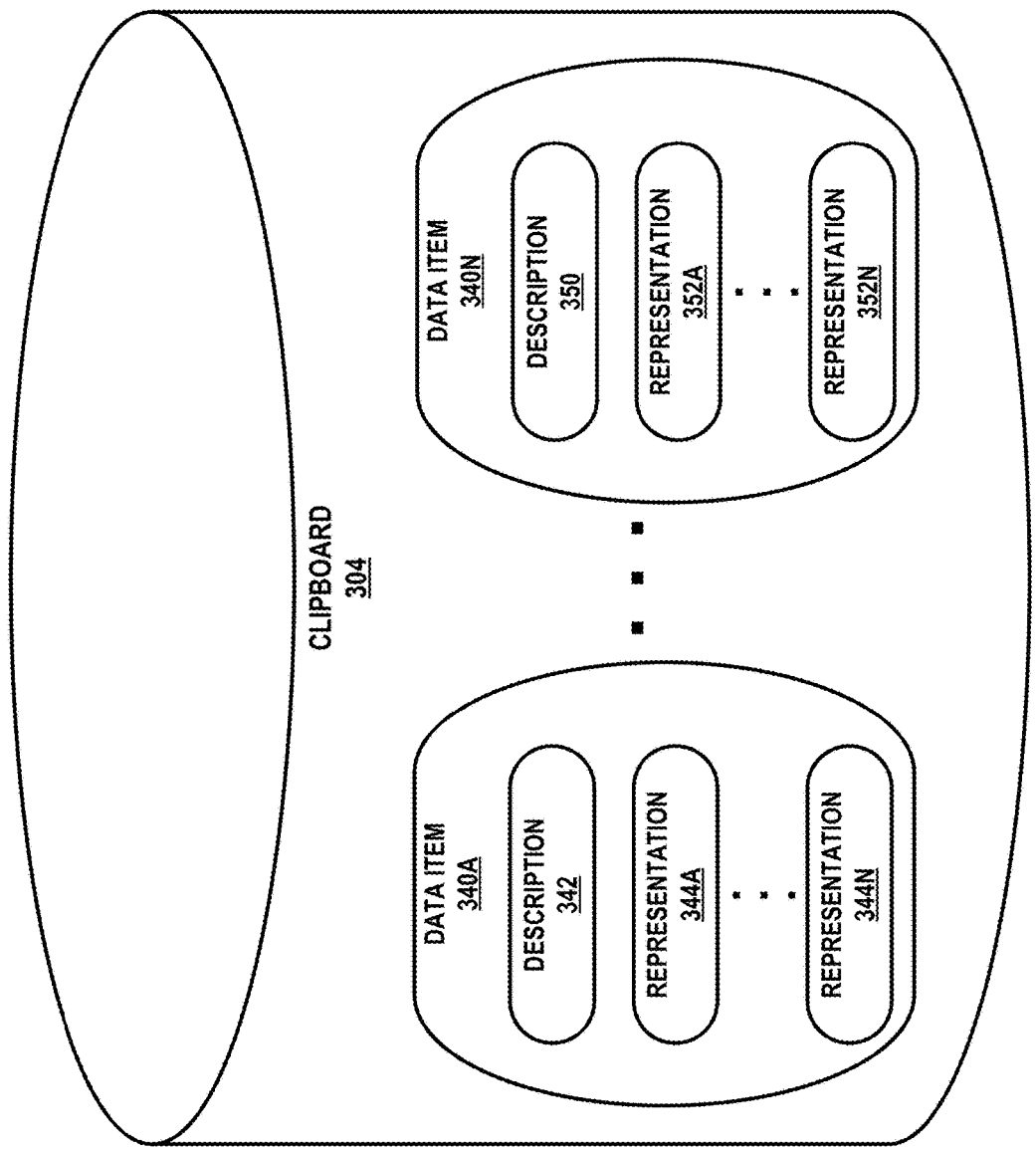
FIG. 3 is a block diagram illustrating an example of the clipboard illustrated in FIG. 1 and/or FIG. 2, in accordance with one or more aspects of present disclosure.

FIG. 3 is a block diagram illustrating an example clipboard 304. In some cases, clipboard 304 may be an example of clipboard 104 (FIG. 1), clipboard 114 (FIG. 1), and/or clipboard 204 (FIG. 2), in accordance with one or more aspects of present disclosure.

As illustrated in FIG. 3, clipboard 304 may include one or more data items 340A-340N (collectively, "data items 340"). As described previously, each data item may comprise one or more representations of that respective data item. As illustrated in the example of FIG. 3, data item 340A includes one or more representations 344A-344N (collectively, "representations 344") of data item 340A. Data item 340N includes one or more representations 352A-352N (collectively, "representations 352") of data item 340N. Each of representations 344 and 352 may comprise a specific representation of the respective data item 340A and 340N, and may each have a corresponding data type. For instance, if data item 340A is an item for a current location of a user or device, representation 344A may be a textual indication of the current location, having a data type of text or plain text. Representation 344N, however, may be another representation of the same data item 340A. For example, representation 344N may be text data with links for the current location, having a data type of link or text with link (e.g., URL link). This representation may comprise more than just plain text, but may further include one or more links to external data, such as a URL to a maps website that indicates this particular location. In another example, representation 344N may be image data of the current location, having a data type of image or bitmap. The data types may, in some cases, be MIME data types, and each of representations 344 and 352 may have a corresponding data type. In some instances, representations 344 and 352 may each include a respective data type indicator in clipboard 304, or otherwise be associated with a respective data type based on the content of each representation.

As also illustrated in FIG. 3, each data item may also have a respective description. Data item 340A includes a description 342, and data item 340N includes a description 350. Description 342 may comprise a description of data item 340A, and description 350 may comprise a description of data item 340N. Descriptions 342 and 350 are, in some examples, textual descriptions that are included in the selectable menu fields that are output to a user during a paste operation. For example, if data item 340A is an item for a current location of a user or device, description 342 may comprise a textual description of "Your current location." In the example of FIG. 1, this textual description of data item 340A may be included in menu 152 to identify one of the data items that may be selected for a paste operation. In some examples, the application that provides data item 340A to the copy module may include description 342. For instance, during a copy operation, application 210A may provide data item 340A to copy module 206, and may include description 342 as part of data item 340A. Copy module 206 may then store data item 340A in clipboard 304.

Figure 4:
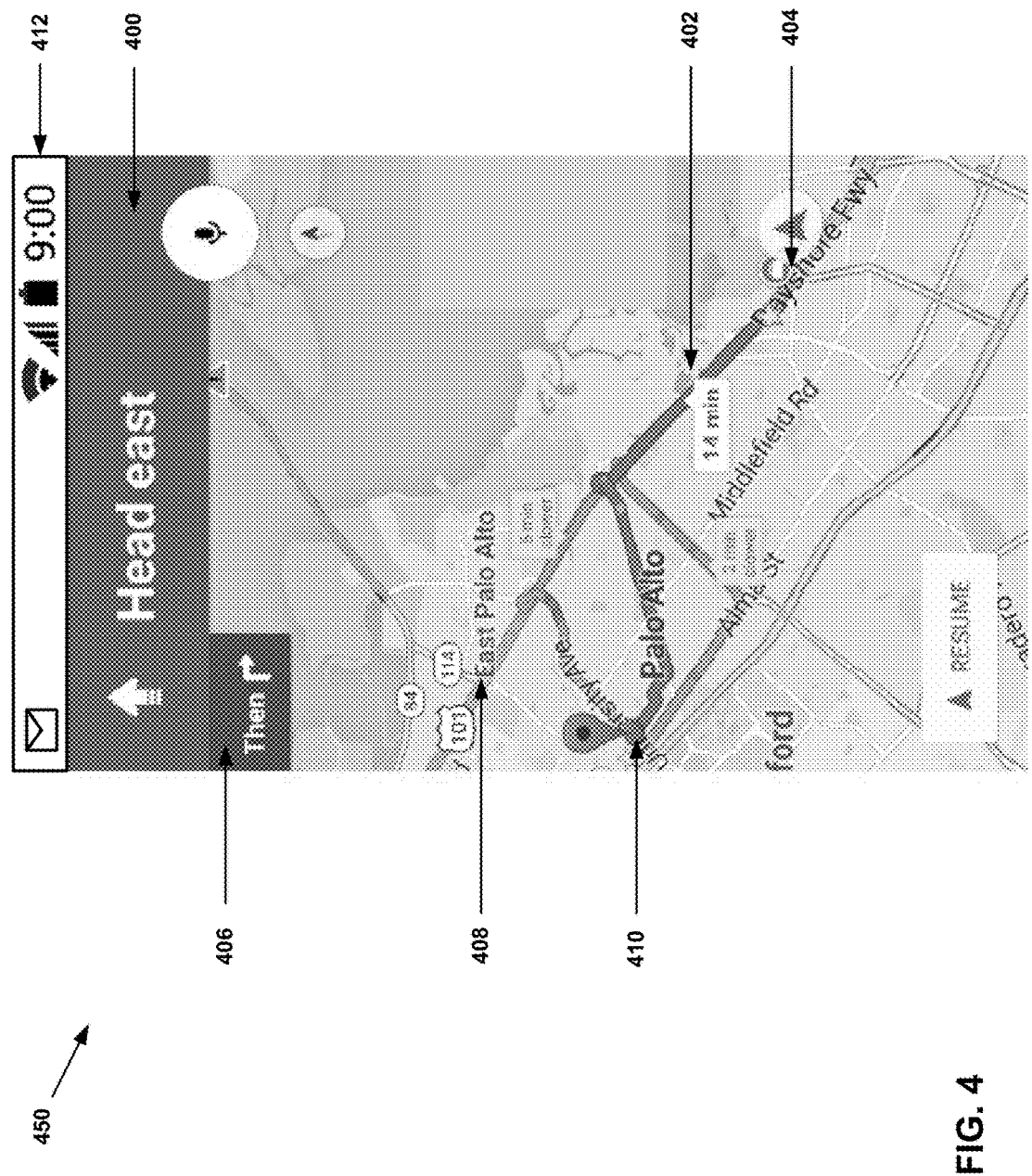
FIG. 4 is a screen diagram illustrating an example of graphical elements that are output for display by a first application prior to or during a copy operation, in accordance with one or more aspects of the present disclosure.

FIG. 4 is a screen diagram illustrating an example of graphical elements that are output for display before or during a copy operation, in accordance with one or more aspects of the present disclosure. As illustrated in the example of FIG. 4, a GUI 450 may include multiple different graphical elements, such as graphical elements 400, 402, 404, 406, 408, 410, and 412. One or more of these graphical elements, including graphical elements 400, 402, 404, 406, 408, and 410, may be output by a particular one of applications 110 (FIG. 1) or applications 210 (FIG. 2), such as application 210A.

In this particular example, application 210A may comprise a navigation application that is capable of outputting map information and providing navigation instructions to a user. Graphical element 404 output by application 210A may be a current location of computing device 200. Graphical element 404 may also comprise a starting location if the user of computing device 200 has requested navigation instructions from this current location to a destination location, which may be represented by graphical element 410. Graphical element 402 may comprise a graphically highlighted route in GUI 450 from the starting location, represented by graphical element 404, to the destination location, represented by graphical element 410.

Graphical element 408 may represent a city ("East Palo Alto") included in the map displayed in GUI 450. Graphical elements 400 and 406 output by application 210A may include onscreen (e.g., textual) navigation instructions that are provided by application 210A. In addition the onscreen instructions, application 210A may also provide audio navigation instructions that are output by output components 226 (FIG. 2).

GUI 450 may also include graphical elements that are output for display by operating system 238 (FIG. 2). For example, as illustrated in FIG. 4, GUI 450 includes system-level graphical elements 412, such as clock indicator, a battery-level indicator, wireless/signal indicators, and an email indicator.

As described previously, during execution of an application, such as application 210A, a user may initiate a copy operation. Upon receiving an indication of an event associated with this copy operation (e.g., user-initiated event), copy module 206 may send application 210A a request for data items that are associated with graphical elements 400, 402, 404, 406, 408, and 410, and these data items may be stored in clipboard 204 within data items 240. Each one of these data items may include one or more representations of the respective data item.

In this example, upon receiving such a request from copy module 206, application 210A may send copy module 206 data items associated with graphical elements 400, 402, 404, 406, 408, and 410. Each data item may include one or more representations of the respective data item that may have a corresponding data type, as described in reference to FIG. 3. In the following description of FIGS. 4-8, it will be assumed that clipboard 204 comprises the example clipboard 304 illustrated in FIG. 3, for non-limiting purposes of illustration only.

In the example of FIG. 4, upon receiving the request from copy module 206, application 210A may provide data items with corresponding representations for one or more of the following, which may be stored in clipboard 304: (a) a current location of computing device 200, which is associated with graphical element 404, where the current location has representations in both plain text and linked text; (b) a map of the area displayed in GUI 450, which is associated with graphical elements 402, 404, 408, 410, and potentially one or more other graphical elements output by application 210A in GUI 450, where the map has a bitmap representation; (c) navigation instructions from the starting location to the destination location, the navigation instructions being associated with graphical elements 400, 406 and having representations in both plain text and linked text (e.g., URL to map site); (d) route information and estimated time of arrival at the destination location, which are associated with graphical elements 402, 404, and 410, where the route information and estimated time of arrival have representations in both plain text and linked text; (e) details about the starting location, which are associated with graphical element 404, where the details include representations in both plain text and linked text (e.g., URL to map site); (f) details about the destination location, which are associated with graphical element 410, where the details include representations in both plain text and linked text (e.g., URL to map site); and (g) details about a city on the map, which are associated with graphical element 408, where the details include representations in both plain text and linked text (e.g., URL to information website). In many cases, the data items are items that are actually displayed and visible in GUI 450 during the copy operation. However, certain ones of the data items are items that may not actually displayed or visible in GUI 450 during the copy operation (e.g., data items that provide further details about the starting location, destination location, or city not shown in GUI 450).

Each individual data item may be stored in data items 340 of clipboard 304. In some examples, copy module 206 stores these data items 340 in clipboard 304. In other examples, application 210A may directly store data items 340 in clipboard 304 upon receiving a request from copy module 206 for a copy operation.

Each individual data item of data items 340 may have a description and one or more representations. For example, as noted below, one data item may be associated with a current location of computing device 200, having representations in both plain text and linked text. This data item may, as one example, be data item 340A, having a description 342 (e.g., textual description of "Your current location"). Representation 344A of data item 340A may include the plain text representation (e.g., address) of the current location. Representation 344N of data item 340A may include the linked text representation (e.g., address text with link to map) of the current location. Similarly, each of the other data items 340 stored in clipboard 304 may include a respective description and one or more representations (e.g., bitmap representation, plain text representation, linked text representation).

In some cases, during a copy operation, copy module 206 may also capture a screenshot of GUI 450 and store this screenshot as a data item in data items 340 of clipboard 304. This data item may include a bitmap representation of the screenshot. In some cases, copy module 206 may also capture a modified screenshot of GUI 450 that does not include system-level graphical elements 412, and store this modified screenshot in data items 340, where this data item also includes a bitmap representation of the modified screenshot. As such, both copy module 206 and one or more of application 210, such as application 210A, are capable of providing one or more data items for inclusion in data items 340 of clipboard 304 during a copy operation. Each data item may include a description (e.g., "Screenshot," "Screenshot without title/nav") and one or more representations.

Figure 5:
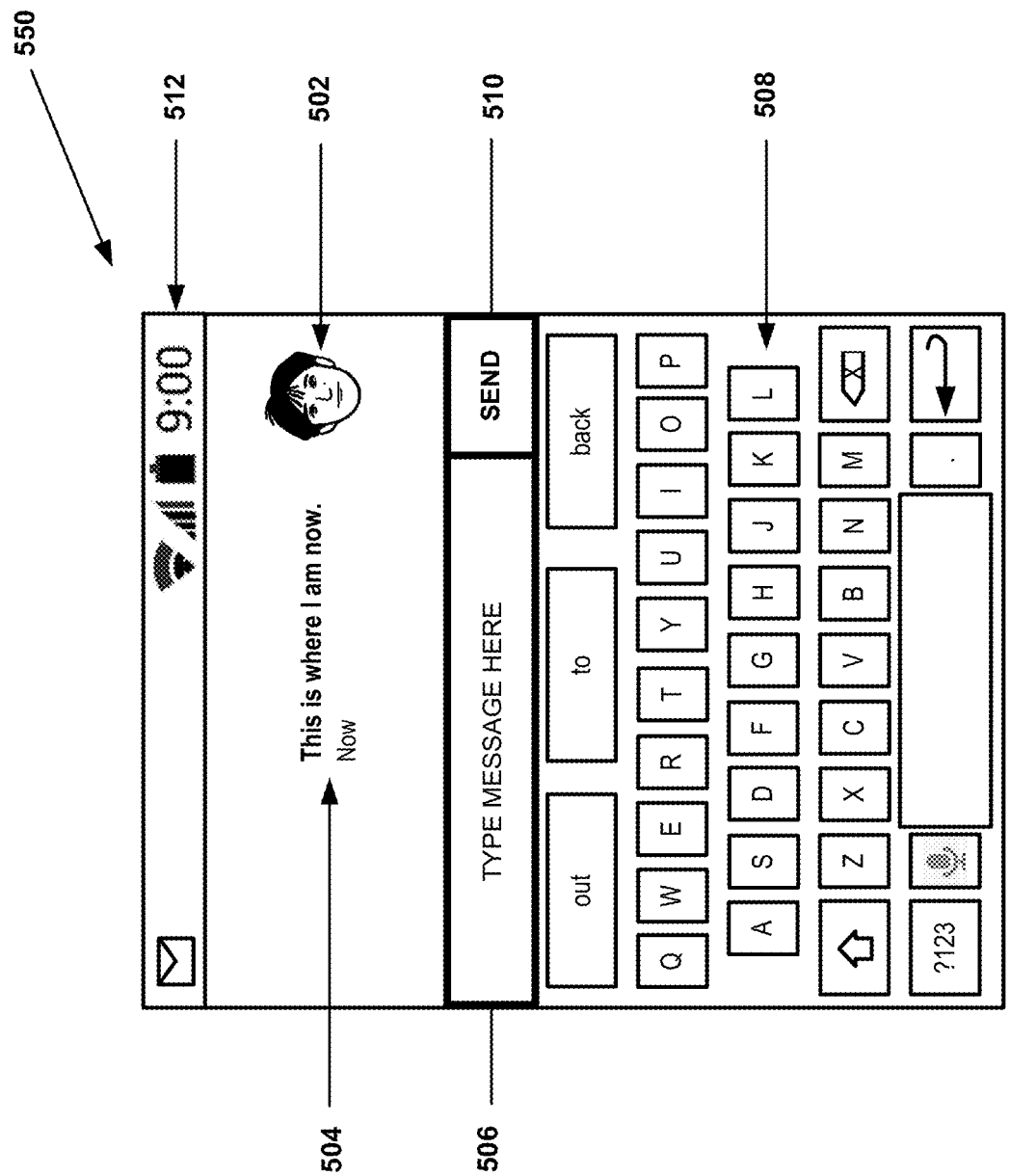
FIG. 5 is a screen diagram illustrating an example of graphical elements that are output for display by a second application prior to or during a paste operation, in accordance with one or more aspects of the present disclosure.

FIG. 5 is a screen diagram illustrating an example of graphical elements that are output for display by a second application prior to or during a paste operation, in accordance with one or more aspects of the present disclosure. In the example of FIG. 5, it may be assumed that computing device 200 is executing a second application different from the first application executing in the example of FIG. 4. For instance, continuing the example described above in reference to FIG. 4, where the first application 210A is a navigation application, FIG. 5 may illustrate a GUI 550 that includes graphical elements output by a second application 210B that is a messaging application, which allows a user of computing device 20 to communicate with one or more other users during one or more messaging sessions.

In the example of FIG. 5, the user of application 210B may be engaged in a messaging session with another user. Application 210B may output various different graphical elements in GUI 550 during execution of application 210B, such as graphical elements 502, 504, 506, 508, and 510. Graphical element 508 may be a graphical keyboard that is output for display by application 210B, and graphical element 506 is a text-entry field. The user may utilize graphical keyboard 508 to input text into text-entry field 506 when creating a message. Graphical element 502 is an icon or other symbol representing the user of computing device 200. During a messaging session, individual messages that originate from the user may be displayed next to an icon representing the user in GUI 550 during execution of a messaging application. Graphical element 510 is a send button, and a user may activate this button to send a message that has been input into text-entry field 506.

Graphical element 504 is a recent message, and it is output for display adjacent to graphical element 502 of the user, indicating that the message was sent from the user to another user during the messaging session. The keyword "Now" indicates that the message "This is where I am now" was just recently sent. Similar to the example in FIG. 4, GUI 550 illustrated in FIG. 5 also includes system-level graphical elements 512, such as clock indicator, a battery-level indicator, wireless/signal indicators, and an email indicator.

FIG. 6 is a screen diagram illustrating examples of data items and/or representations of data items that may be pasted during a paste operation, in accordance with one or more aspects of the present disclosure. Similar to the example in FIGS. 4-5, GUI 650 illustrated in FIG. 6 also includes system-level graphical elements 612, such as clock indicator, a battery-level indicator, wireless/signal indicators, and an email indicator.

Continuing with the example of FIG. 5, during execution of application 210B, the user of computing device 200 may initiate a paste operation. Upon receiving an indication of an event associated with this paste operation (e.g., user-initiated event), paste module 208 may determine, from data items 340 stored in clipboard 304, a group of one or more data items that each satisfy at least one criterion for the paste operation specified by application 210B, and may retrieve this group of data items from clipboard 304.

In some examples, paste module 208 is configured to determine the group of data items that each satisfy the at least one criterion for the paste operation by sending application 210B a request to obtain the at least one criterion for the paste operation. Responsive to sending the request to application 210B, paste module 208 may receive, from application 210B, the at least one criterion for the paste operation, and then determine, based on which data items from data items 240 satisfy the at least one criterion, the group of data items.

As one non-limiting example, sending the request to obtain the at least one criterion may include sending, by paste module 208 and to application 210B, the request to obtain an indication of one or more data types (e.g., MIME types) that are supported by application 210B for the paste operation. Responsive to sending this request, paste module 208 receives, from application 210B, the indication of the one or more data types that are supported by application 210B for the paste operation. Copy module 208 is capable of determining the group of data items by determining whether the respective one or more representations included in each data item of data items 240 are associated with at least one data type that matches the one or more data types supported by application 210B for the paste operation.

For example, application 210B may specify (e.g., using MIME type indicators) that it supports any of the data types for bitmap data, plain text data, and/or text data with links (e.g., URL links) in responding to paste module 208. Paste module 208 may then filter and retrieve the group of data items from data items 340 stored in clipboard 304 having one or more representations associated with these supported data types. Paste module 208 may output, for display in GUI 650 illustrated in FIG. 6, a group of selectable elements, wherein each selectable element in the group of selectable elements corresponds to a respective data item in the group of data items retrieved from clipboard 304. The group of selectable elements may be included for display within graphical element 602 shown in FIG. 6, which comprises a menu with a title "Select item(s) to paste."

Each element in menu 602 is a selectable element that corresponds to a respective data item. As described previously in reference to FIG. 3, each data item may include a textual description of the respective data item. For example, as illustrated in FIG. 3, data item 340A includes description 342, and data item 340N includes description 350. When outputting the selectable elements in menu 602 of FIG. 6, where each element corresponds to a respective data item, paste module 208 may output, for each selectable element in the group of selectable elements, the textual description of the respective data item that corresponds to the respective selectable element (e.g., the description 342 for data item 340A, the description 350 for data item 340N).

Thus, as shown in FIG. 6, for the first selectable element in menu 602, paste module 208 outputs the textual description "Screenshot," which is the description of the respective data item in data items 340 for the screenshot that was previously captured by copy module 206. For the second selectable element in menu 602, paste module 208 outputs the textual description "Screenshot without title bar/system UI," which is the description of the respective data item in data items 340 for the screenshot (without the title bar/system user interface included in graphical elements 412 shown in FIG. 4) previously captured by copy module 206. For the third selectable element in menu 602, paste module 208 outputs the textual description "Your current location," which is the description of the respective data item for the current location associated with graphical element 404, as previously provided by application 210A in response to the request from copy module 206.

For the fourth selectable element in menu 602, paste module 208 outputs the textual description "Map of the area," which is the description of the respective data item for the map of the area associated with, e.g., graphical elements 402, 404, 408, 410, as previously provided by application 210A. For the fifth selectable element in menu 602, paste module 208 outputs the textual description "Navigation instructions from LOCATION 1 to LOCATION 2," which is the description of the respective data item for the navigation instructions from a starting location (LOCATION 1) to a destination location (LOCATION 2) associated with graphical elements 400 and 410. For the sixth selectable element in menu 602, paste module 208 outputs the textual description "Your route and ETA for navigation from LOCATION 1 to LOCATION 2," which is the description of the respective data item for route information and estimated time of arrival at the destination location associated with graphical elements 402, 404, and 410.

For the seventh selectable element in menu 602, paste module 208 outputs the textual description "Details about LOCATION 1," which is the description of the respective data item for details about the starting location (LOCATION 1) associated with graphical element 404. For the eight selectable element in menu 602, paste module 208 outputs "Details about LOCATION 2," which is the description of the respective data item for details about the destination location (LOCATION 2) associated with graphical element 410. Finally, for the ninth selectable element in menu 602, paste module 208 outputs "Details about East Palo Alto," which is the description of the respective data item for details about a city (East Palo Alto) on the map, associated with graphical element 408.

For each of the selectable elements in menu 602, the corresponding data item has at least one representation with a data type that matches one of the data types supported by application 210B for the paste operation, which, in this example are the data types for bitmap data, plain text data, and/or text data with links (e.g., URL links) in responding to paste module 208. Paste module 208 may then filter and retrieve the group of data items from data items 340 stored in clipboard 304 having one or more representations associated with these supported data types. In an alternate example, if application 210B indicated, instead, that it only supports for plain text data and/or text data with links, paste module 208 would not include the selectable items "Screenshot," "Screenshot without title bar/system UI," or "Map of the area" in menu 602, as the data items that correspond to these elements only have bitmap representations of these particular items. In this way, paste module 208 is able to selectively filter data items 340 and only include elements in menu 602 that correspond to data items having at least one representation of a type that matches one of the supported types of application 210B for a paste operation.

As shown in the example of FIG. 6, there can be multiple different data items of data items 340 that correspond to multiple different selectable elements included in menu 602. A user may select one or more of these selectable elements for a paste operation. Paste module 208 may receive an indication of a selection of at least one selectable data element from the group of selectable elements in menu 602 that corresponds to the at least one data item, such as shown in the example of FIG. 7.

FIG. 7 is a screen diagram illustrating example selections of data items and/or representations of data items illustrated in FIG. 6, in accordance with one or more aspects of the present disclosure. In the example of FIG. 7, GUI 750 includes graphical elements 712 and 702. Similar to the examples in FIGS. 4-6, GUI 750 illustrated in FIG. 7 also includes system-level graphical elements 712, such as clock indicator, a battery-level indicator, wireless/signal indicators, and an email indicator. Graphical element 702 is a menu.

In the particular example of FIG. 7, the user has selected multiple different selectable elements in menu 702. The selected elements correspond to the data items having the descriptions "Your current location" and "Details about LOCATION 1," as indicated by the user-provided checks in the checkboxes located adjacent to these third and seventh selectable elements in menu 702.

As described previously, the data item corresponding to "Your current location" is a data item having both a textual representation and a linked text representation. The data item corresponding to "Details about LOCATION 1" (starting location) also has both a textual representation and a linked text representation. In the examples shown in FIGS. 6 and 7, the selectable elements correspond only to the data items themselves (e.g., "Your current location" and "Details about LOCATION 1"). However, in alternate examples, each selectable element in menu 602 and/or menu 702 may correspond to individual representations of data items. In these examples, menu 702, for instance, may include a selectable element for each representation of the data items included in the filtered group of data items selected by paste module 208 (e.g., one selectable element for the textual representation of "Your current location," and another selectable element for the linked text representation of "Your current location"). In these examples, the text associated with each selectable element may include the description of the data item (e.g., description 342, description 350 shown in FIG. 3) in conjunction with additional text indicating the type of representation (e.g., text, linked text, bitmap).

The examples of FIGS. 6-7 illustrate multiple selectable elements in menus 602 and 702, respectively. However, in the case that paste module 208 determines that only one data item in the filtered group of data items satisfies the selection criteria specified by application 210B for the paste operation, in certain examples, paste module 208 may not present a menu and may automatically select this data item for the paste operation.

Figure 8:
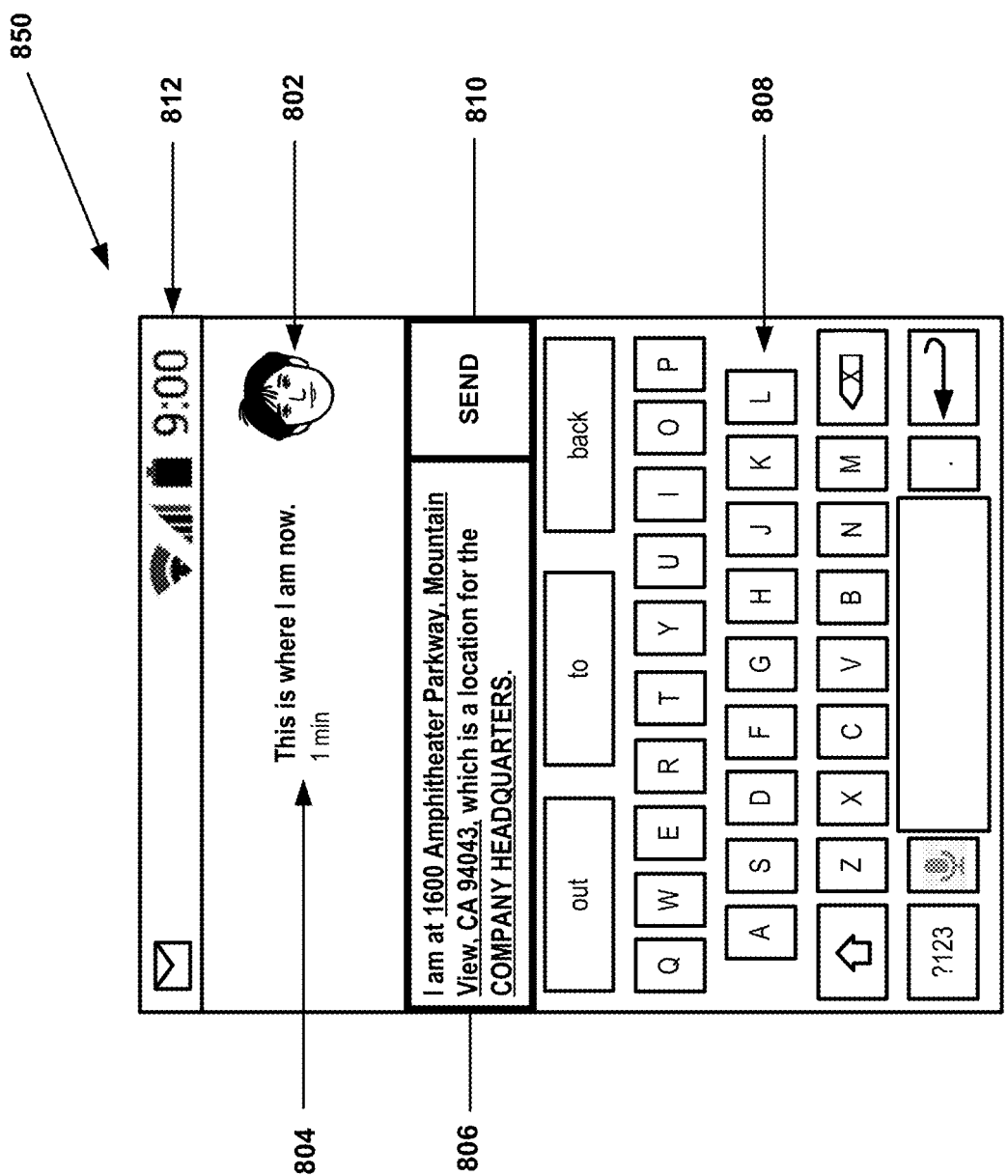
FIG. 8 is a screen diagram illustrating an example of graphical elements that are output for display by the second application after the paste operation, in accordance with one or more aspects of the present disclosure.

FIG. 8 is a screen diagram illustrating an example of graphical elements that are output for display by application 210B after the paste operation, in accordance with one or more aspects of the present disclosure. Similar to the example of FIGS. 4-7, GUI 850 illustrated in FIG. 8 also includes system-level graphical elements 812, such as clock indicator, a battery-level indicator, wireless/signal indicators, and an email indicator.

Continuing with the example of FIG. 7, after paste module 208 has determined the group of data items from data items 340 that each satisfy at least one criterion for the paste operation specified by application 210B, paste module 208 retrieves at least one data item of the group of data items from clipboard 304 and sends the at least one data item to application 210B for output in the GUI. GUI 850 further includes graphical elements 802, 804, 806, 808, and 810 that are output by application 210B during execution. Graphical element 808 is a graphical keyboard, graphical element 806 is a text-entry field, and graphical element 802 is an icon or other symbol representing the user of computing device 200. Graphical element 810 is a send button that a user may activate to send a message that has been input into text-entry field 806. Graphical element 804 is a recent message, and it is output for display adjacent to graphical element 802 of the user, indicating that the message was sent from the user to another user during the messaging session. The keywords "1 min" indicates that the message "This is where I am now" was just recently sent, such as in the last minute.

Upon receiving the data items from paste module 208 during the paste operation, as described above in reference to FIG. 7, application 210B may output one or more representations of these data items for display within GUI 850 to complete the paste operation. In some cases, application 210B may output these representations into an area of GUI 850 based on a user selection. For example, if a user has selected text-entry field 806 prior to the paste operation, application 210B may output these representations into text-entry field 806 during the paste operation. In some examples, application 210B may output the representations into text-entry field 806 based on the context and/or state of application 210B, given that the primary area of data input during execution of application 210B is text-entry field 806.

Continuing from the example of FIG. 7, the user has selected the data items for "Your current location" and "Details about LOCATION 1." Each of these data items includes a textual representation and a linked text representation. Because the data items provided to application 210B includes all of the different representations supported by application 210B, application 210B is capable of choosing the one or more representations that will be output in, for example, text-entry field 806. For example, application 210B may choose the first supported representation (e.g., representation 344A) in the representations (e.g., representations 344A-344N) for a given data item (e.g., data item 340A). In some examples, application 210B may choose a representation based on an order and/or defined priority of representations (e.g., first choice is text with links if available, second choice is text if available, and third choice is bitmap). In some examples, application 210B may choose a representation based on a current context and/or state of operation of application 210B.

As shown in graphical element 810, application 210B has inserted, into text-entry field 806, the linked text representation of the data item for "Your current location," which includes a particular address of the current location of the user and also a link (e.g., URL) to another website (e.g., map website) that may show this location on a graphical map when selected. The linked text, inserted as "1600 Amphitheater Parkway, Mountain View, Calif. 94043" into text-entry field 806 during the paste operation, is underlined in text-entry field 806 to indicate that it is linked text selectable by the user. Application 210B has also inserted the linked text representation of the data item for "Details about LOCATION 1" (starting location), where, in this example, LOCATION 1 is the same as the current location of the user. This linked text, inserted as "COMPANY HEADQUARTERS" into text-entry field 806, is underlined in text-entry field 806 to indicate that it is linked text selectable by the user to follow a link to another website that may provide further details about LOCATION 1. In this particular example, the additional details about LOCATION 1 indicate that this location is the headquarters of a particular company, based on further details that were provided by application 210A during the copy operation.

As shown in text-entry field 806, the additional text of "I am at" precedes the inserted linked text of "1600 Amphitheater Parkway, Mountain View, Calif. 94043." Additionally, the text of "which is a location for the" precedes the inserted linked text of "COMPANY HEADQUARTERS." In some examples, paste module 208 only inserts the linked text "1600 Amphitheater Parkway, Mountain View, Calif. 94043" and "COMPANY HEADQUARTERS," and the user may use graphical keyboard 808 to further insert the text "I am at" and "which is a location for the" into text-entry field 806. In other examples, paste module 208 may automatically insert this additional text into text-entry field 806 based on the descriptions of the selected data items in menu 702, where these descriptions are also stored in clipboard 304 (e.g., in description 342 or 350). Thus, in the example shown in FIG. 7, because the user has selected the data items for "Your current location" and "Details about LOCATION 1," paste module 208 may, in some examples, insert the additional text of "Your current location" along with the linked text of "1600 Amphitheater Parkway, Mountain View, Calif. 94043," and may also insert the additional text of "Details about LOCATION 1" along with the linked text of "COMPANY HEADQUARTERS."

GUI 850 also includes send button 810. When the paste operation is complete, and once the message displayed in text-entry field 806 is ready to send, the user may activate send button 810 to send the message. Once sent, the message may be shown below graphical element 804, and the user may enter additional message text, or paste additional information using one or more additional paste operations, into text-entry field 806.

Figure 9:
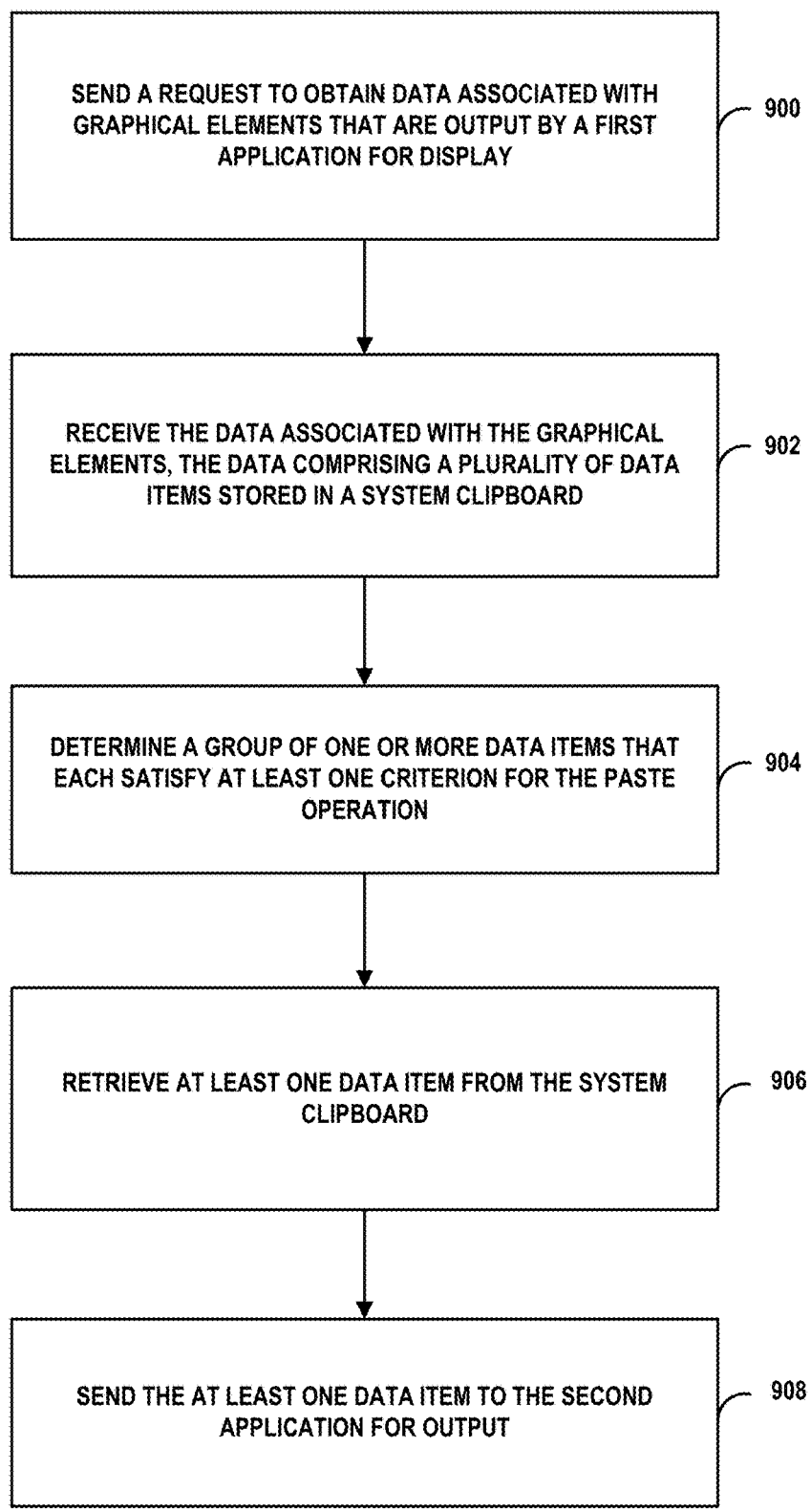
FIG. 9 is a flowchart illustrating example operations of a computing device, such as the computing device illustrated in FIG. 1 and/or FIG. 2, in accordance with one or more aspects of the present disclosure.

FIG. 9 is a flowchart illustrating example operations of a computing device, such as computing device 100 and/or 200, in accordance with one or more aspects of the present disclosure. For purposes of illustration only, the operations of FIG. 9 are described with reference to computing device 200 shown in FIG. 2.

During execution of a first application (e.g., application 210A) on a computing device (computing device 200), and responsive to receiving an indication of a first event to initiate a copy operation associated with a system clipboard (e.g., clipboard 204), copy module 206 sends (900), to the first application, a request to obtain data associated with one or more graphical elements that are output by the first application for display in a GUI. Responsive to sending the request to the first application, copy module 206 receives (902), from the first application, the data associated with the one or more graphical elements, wherein the data comprises a plurality of data items, wherein each data item of the plurality of data items includes one or more representations of the respective data item, and wherein each data item of the plurality of data items is stored in the system clipboard.

During execution of a second application (e.g., application 210B) on the computing device, and responsive to receiving an indication of a second event to initiate a paste operation associated with the system clipboard, paste module 208 determines (904), from the plurality of data items, a group of data items (e.g., group of one or more data items) that each satisfy at least one criterion for the paste operation specified by the second application, and retrieves (906) at least one data item of the group of data items from the system clipboard. Paste module 208 also sends (908) the at least one data item to the second application for output in the GUI.

Example 1

A method comprising: during execution of a first application on a computing device, and responsive to receiving an indication of a first event to initiate a copy operation associated with a system clipboard, sending, to the first application, a request to obtain data associated with one or more graphical elements that are output by the first application for display; responsive to sending the request to the first application, receiving, from the first application, the data associated with the one or more graphical elements, wherein the data comprises a plurality of data items, wherein each data item of the plurality of data items includes one or more representations of the respective data item, and wherein each data item of the plurality of data items is stored in the system clipboard; during execution of a second application on the computing device, and responsive to receiving an indication of a second event to initiate a paste operation associated with the system clipboard, determining, from the plurality of data items, a group of data items that each satisfy at least one criterion for the paste operation specified by the second application; retrieving at least one data item of the group of data items from the system clipboard; and sending the at least one data item to the second application for output.

Example 2

The method of example 1, wherein sending the request, receiving the data, determining the group of one or more data items, retrieving the at least one data item, and sending the at least one data item are performed by an operating system executing on the computing device.

Example 3

The method of any of examples 1-2, further comprising: outputting, for display, a group of selectable elements, wherein each selectable element in the group of selectable elements corresponds to a respective data item in the group of data items; and receiving an indication of a selection of at least one selectable data element from the group of selectable elements that corresponds to the at least one data item.

Example 4

The method of example 3, wherein each data item of the plurality of data items further includes a textual description of the respective data item, and wherein outputting the group of selectable elements comprises outputting, for each selectable element in the group of selectable elements, the textual description of the respective data item that corresponds to the respective selectable element.

Example 5

The method of example 3, wherein the group of data items comprises multiple data items, wherein the group of selectable elements comprises multiple selectable elements, and wherein receiving the indication of the selection of the at least one selectable data element from the group of selectable elements comprises receiving the indication of the selection of a plurality of selectable data elements from the multiple selectable elements.

Example 6

The method of any of examples 1-5, wherein determining the group of data items that each satisfy the at least one criterion for the paste operation specified by the second application comprises: sending, to the second application, a request to obtain the at least one criterion for the paste operation; responsive to sending the request to the second application, receiving, from the second application, the at least one criterion for the paste operation; and determining, based on which data items from the plurality of data items satisfy the at least one criterion, the group of data items.

Example 7

The method of example 6, wherein sending, to the second application, a request to obtain the at least one criterion comprises sending, to the second application, the request to obtain an indication of one or more data types that are supported by the second application for the paste operation, wherein receiving, from the second application, the at least one criterion comprises receiving, from the second application, the indication of the one or more data types that are supported by the second application for the paste operation, and wherein determining, based on which data items from the plurality of data items satisfy the at least one criterion, the group of data items comprises determining whether the respective one or more representations included in each data item of the plurality of data items are associated with at least one data type that matches the one or more data types supported by the second application for the paste operation.

Example 8

The method of any of examples 1-7, wherein determining the group of data items that each satisfy the at least one criterion for the paste operation specified by the second application comprises determining the group of data items further based at least in part on one or more graphical elements that are output for display by the second application.

Example 9

The method of any of examples 1-8, wherein a first data item of the plurality of data items received from the first application includes one or more representations of the first data item that are not output for display by the first application.

Example 10

The method of any of examples 1-9, wherein the plurality of data items comprises a first plurality of data items, and wherein the method further comprises: during execution of a third application on the computing device, and responsive to receiving the indication of the first event to initiate the copy operation associated with the system clipboard, sending, to the third application, a request to obtain data associated with one or more graphical elements that are output for display by the third application; and responsive to sending the request to the third application, receiving, from the third application, the data associated with the one or more graphical elements that are output for display by the third application, wherein the data associated with the one or more graphical elements that are output for display by the third application comprises a second plurality of data items, wherein each data item of the second plurality of data items includes one or more representations of the respective data item, and wherein each data item of the second plurality of data items is stored in the system clipboard, wherein during execution of the second application on the computing device, and responsive to receiving the indication of the second event to initiate the paste operation associated with the system clipboard, determining the group of data items that each satisfy the at least one criterion comprises determining, from both the first plurality of data items and the second plurality of data items, the group of data items.

Example 11

The method of any of examples 1-10, wherein the system clipboard is stored on a device external to the computing device.

Example 12

The method of any of examples 1-11, wherein the first application is different from the second application.

Example 13

The method of any of examples 1-12, further comprising: during execution of the first application on the computing device, and responsive to receiving the indication of the first event to initiate the copy operation associated with the system clipboard, obtaining a screenshot associated with the one or more graphical elements that are output by the first application for display, wherein the screenshot is also stored in the plurality of data items in the system clipboard.

Example 14

A computer-readable storage medium encoded with instructions that, when executed, cause at least one processor to perform the method of any of examples 1-13.

Example 15

A computer-readable storage medium encoded with instructions that, when executed, cause at least one processor to perform operations comprising: during execution of a first application, and responsive to receiving an indication of a first event to initiate a copy operation associated with a system clipboard, sending, to the first application, a request to obtain data associated with one or more graphical elements that are output by the first application for display; responsive to sending the request to the first application, receiving, from the first application, the data associated with the one or more graphical elements, wherein the data comprises a plurality of data items, wherein each data item of the plurality of data items includes one or more representations of the respective data item, and wherein each data item of the plurality of data items is stored in the system clipboard; during execution of a second application, and responsive to receiving an indication of a second event to initiate a paste operation associated with the system clipboard, determining, from the plurality of data items, a group of data items that each satisfy at least one criterion for the paste operation specified by the second application; retrieving at least one data item of the group of data items from the system clipboard; and sending the at least one data item to the second application for output.

Example 16

The computer-readable storage medium of example 15, wherein sending the request, receiving the data, determining the group of data items, retrieving the at least one data item, and sending the at least one data item are performed by an operating system executing on the computing device.

Example 17

The computer-readable storage medium of any of examples 15-16, wherein the operations further comprise: outputting, for display, a group of selectable elements, wherein each selectable element in the group of selectable elements corresponds to a respective data item in the group of data items; and receiving an indication of a selection of at least one selectable data element from the group of selectable elements that corresponds to the at least one data item.

Example 18

The computer-readable storage medium of example 17, wherein each data item of the plurality of data items further includes a textual description of the respective data item, and wherein outputting the group of selectable elements comprises outputting, for each selectable element in the group of selectable elements, the textual description of the respective data item that corresponds to the respective selectable element.

Example 19

The computer-readable storage medium of example 17, wherein the group of data items comprises multiple data items, wherein the group of selectable elements comprises multiple selectable elements, and wherein receiving the indication of the selection of the at least one selectable data element from the group of selectable elements comprises receiving the indication of the selection of a plurality of selectable data elements from the multiple selectable elements.

Example 20

The computer-readable storage medium of any of examples 15-19, wherein determining the group of data items that each satisfy the at least one criterion for the paste operation specified by the second application comprises: sending, to the second application, a request to obtain the at least one criterion for the paste operation; responsive to sending the request to the second application, receiving, from the second application, the at least one criterion for the paste operation; and determining, based on which data items from the plurality of data items satisfy the at least one criterion, the group of data items.

Example 21

The computer-readable storage medium of example 20, wherein sending, to the second application, a request to obtain the at least one criterion comprises sending, to the second application, the request to obtain an indication of one or more data types that are supported by the second application for the paste operation, wherein receiving, from the second application, the at least one criterion comprises receiving, from the second application, the indication of the one or more data types that are supported by the second application for the paste operation, and wherein determining, based on which data items from the plurality of data items satisfy the at least one criterion, the group of data items comprises determining whether the respective one or more representations included in each data item of the plurality of data items are associated with at least one data type that matches the one or more data types supported by the second application for the paste operation.

Example 22

The computer-readable storage medium of any of examples 15-21, wherein determining the group of data items that each satisfy the at least one criterion for the paste operation specified by the second application comprises determining the group of data items further based at least in part on one or more graphical elements that are output for display by the second application.

Example 23

The computer-readable storage medium of any of examples 15-22, wherein a first data item of the plurality of data items received from the first application includes one or more representations of the first data item that are not output for display by the first application.

Example 24

The computer-readable storage medium of any of examples 15-23, wherein the plurality of data items comprises a first plurality of data items, and wherein the operations further comprise: during execution of a third application on the computing device, and responsive to receiving the indication of the first event to initiate the copy operation associated with the system clipboard, sending, to the third application, a request to obtain data associated with one or more graphical elements that are output for display by the third application; and responsive to sending the request to the third application, receiving, from the third application, the data associated with the one or more graphical elements that are output for display by the third application, wherein the data associated with the one or more graphical elements that are output for display by the third application comprises a second plurality of data items, wherein each data item of the second plurality of data items includes one or more representations of the respective data item, and wherein each data item of the second plurality of data items is stored in the system clipboard, wherein during execution of the second application on the computing device, and responsive to receiving the indication of the second event to initiate the paste operation associated with the system clipboard, determining the group of data items that each satisfy the at least one criterion comprises determining, from both the first plurality of data items and the second plurality of data items, the group of data items.

Example 25

The computer-readable storage medium of any of examples 15-24, wherein the system clipboard is stored on a device external to the computing device.

Example 26

The computer-readable storage medium of any of examples 15-25, wherein the first application is different from the second application.

Example 27

The computer-readable storage medium of any of examples 15-26, wherein the operations further comprise: during execution of the first application on the computing device, and responsive to receiving the indication of the first event to initiate the copy operation associated with the system clipboard, obtaining a screenshot associated with the one or more graphical elements that are output by the first application for display, wherein the screenshot is also stored in the plurality of data items in the system clipboard.

Example 28

The computer-readable storage medium of example 15, wherein the instructions, when executed, cause the at least one processor to further perform the method of any of examples 2-13.

Example 29

A computing device comprising means for performing the method of any of examples 1-13.

Example 30

A computing device comprising one or more processors configured to perform the method of any of examples 1-13.

Example 31

A computing device, comprising: at least one processor; at least one storage device communicatively coupled to the at least one processor, wherein the at least one storage device is configured to store a system clipboard; and a presence-sensitive display device communicatively coupled to the at least one processor and to the at least one storage device, wherein the at least one processor is configured to: during execution of a first application, and responsive to receiving an indication of a first event to initiate a copy operation associated with the system clipboard, send, to the first application, a request to obtain data associated with one or more graphical elements that are output by the first application for display at the presence-sensitive display device;

responsive to sending the request to the first application, receive, from the first application, the data associated with the one or more graphical elements, wherein the data comprises a plurality of data items, wherein each data item of the plurality of data items includes one or more representations of the respective data item, and wherein each data item of the plurality of data items is stored in the system clipboard; during execution of a second application, and responsive to receiving an indication of a second event to initiate a paste operation associated with the system clipboard, determine, from the plurality of data items, a group of data items that each satisfy at least one criterion for the paste operation specified by the second application; retrieve at least one data item of the group of data items from the system clipboard; and send the at least one data item to the second application for output at the presence-sensitive display device.

Example 32

The computing device of example 31, wherein the at least one processor is configured to send the request, receive the data, determine the group of one or more data items, retrieve the at least one data item, and send the at least one data item at least by executing an operating system.

Example 33

The computing device of any of examples 31-32, wherein the at least one processor is further configured to: output, for display, a group of selectable elements, wherein each selectable element in the group of selectable elements corresponds to a respective data item in the group of data items; and receiving an indication of a selection of at least one selectable data element from the group of selectable elements that corresponds to the at least one data item.

Example 34

The computing device of example 33, wherein each data item of the plurality of data items further includes a textual description of the respective data item, and wherein the at least one processor is configured to output the group of selectable elements at least by outputting, for each selectable element in the group of selectable elements, the textual description of the respective data item that corresponds to the respective selectable element.

Example 35

The computing device of example 33, wherein the group of data items comprises multiple data items, wherein the group of selectable elements comprises multiple selectable elements, and wherein the at least one processor is configured to receive the indication of the selection of the at least one selectable data element from the group of selectable elements at least by receiving the indication of the selection of a plurality of selectable data elements from the multiple selectable elements.

Example 36

The computing device of any of examples 31-35, wherein the at least one processor is configured to determine the group of data items that each satisfy the at least one criterion for the paste operation specified by the second application at least by: sending, to the second application, a request to obtain the at least one criterion for the paste operation; responsive to sending the request to the second application, receiving, from the second application, the at least one criterion for the paste operation; and determining, based on which data items from the plurality of data items satisfy the at least one criterion, the group of data items.

Example 37

The computing device of example 36, wherein the at least one processor is configured to send, to the second application, a request to obtain the at least one criterion at least by sending, to the second application, the request to obtain an indication of one or more data types that are supported by the second application for the paste operation, wherein the at least one processor is configured to receive, from the second application, the at least one criterion at least by receiving, from the second application, the indication of the one or more data types that are supported by the second application for the paste operation, and wherein the at least one processor is configured to determine, based on which data items from the plurality of data items satisfy the at least one criterion, the group of data items at least by determining whether the respective one or more representations included in each data item of the plurality of data items are associated with at least one data type that matches the one or more data types supported by the second application for the paste operation.

Example 38

The computing device of any of examples 31-37, wherein the at least one processor is configured to determine the group of data items that each satisfy the at least one criterion for the paste operation specified by the second application at least by determining the group of data items further based at least in part on one or more graphical elements that are output for display by the second application.

Example 39

The computing device of any of examples 31-38, wherein a first data item of the plurality of data items received from the first application includes one or more representations of the first data item that are not output for display by the first application.

Example 40

The computing device of any of examples 31-39, wherein the plurality of data items comprises a first plurality of data items, and wherein the at least one processor is further configured to: during execution of a third application on the computing device, and responsive to receiving the indication of the first event to initiate the copy operation associated with the system clipboard, send, to the third application, a request to obtain data associated with one or more graphical elements that are output for display by the third application; and responsive to sending the request to the third application, receive, from the third application, the data associated with the one or more graphical elements that are output for display by the third application, wherein the data associated with the one or more graphical elements that are output for display by the third application comprises a second plurality of data items, wherein each data item of the second plurality of data items includes one or more representations of the respective data item, and wherein each data item of the second plurality of data items is stored in the system clipboard, wherein during execution of the second application on the computing device, and responsive to receiving the indication of the second event to initiate the paste operation associated with the system clipboard, the at least one processor is configured to determine the group of data items that each satisfy the at least one criterion at least by determining, from both the first plurality of data items and the second plurality of data items, the group of data items.

Example 41

The computing device of any of examples 31-40, wherein the system clipboard is stored on a device external to the computing device.

Example 42

The computing device of any of examples 31-41, wherein the first application is different from the second application.

Example 43

The computing device of any of examples 31-42, wherein the at least one processor is further configured to: during execution of the first application on the computing device, and responsive to receiving the indication of the first event to initiate the copy operation associated with the system clipboard, obtain a screenshot associated with the one or more graphical elements that are output by the first application for display, wherein the screenshot is also stored in the plurality of data items in the system clipboard.

Example 44

The computing device of example 31, wherein the at least one processor is further configured to perform the method of any of examples 2-13.

Example 45

The computing device of example 31, further comprising means for performing the method of any of examples 2-13.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSP's), general purpose microprocessors, application specific integrated circuits (ASIC's), field programmable logic arrays (FPGA's), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processors as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   during execution of a first application on a computing device, and responsive to receiving an indication of a first event to initiate a copy operation associated with a system clipboard, sending, by an operating system executed by the computing device, and to the first application, a request to obtain data associated with one or more graphical elements that are output by the first application for display;

responsive to sending the request to the first application, receiving, by the operating system and from the first application, the data associated with the one or more graphical elements, wherein the data comprises a plurality of data items provided by the first application, wherein each data item of the plurality of data items includes one or more representations of the respective data item, and wherein each data item of the plurality of data items is stored in the system clipboard;

during execution of a second application on the computing device:

sending, by the operating system and to the second application via an application programming interface, a request to obtain an indication of one or more data types that are supported by the second application for a paste operation; and responsive to sending the request to the second application, receiving, by the operating system and from the second application, the indication of the one or more data types that are supported by the second application for the paste operation;

responsive to receiving an indication of a second event to initiate the paste operation associated with the system clipboard, identifying, by the operating system and from the plurality of data items stored in the system clipboard, a filtered group of data items, wherein each data item in the filtered group of data items includes at least one representation having a respective data type that matches at least one of the one or more data types supported by the second application for the paste operation;

outputting, by the operating system and for display, a filtered list of selectable elements that correspond to the filtered group of data items;

receiving, by the operating system, an indication of a selection of at least one selectable element from the filtered list of selectable elements, wherein the at least one selectable element corresponds to at least one data item included in the filtered group of data items;

retrieving, by the operating system, the at least one data item from the system clipboard; and sending, by the operating system and to the second application, the at least one data item.

2. The method of claim 1, wherein each data item of the plurality of data items further includes a textual description of the respective data item, and wherein outputting the filtered group of selectable elements comprises outputting, for each selectable element in the filtered group of selectable elements, the textual description of the respective data item that corresponds to the respective selectable element.

3. The method of claim 1, wherein the filtered group of data items comprises multiple data items, wherein the filtered group of selectable elements comprises multiple selectable elements, and wherein receiving the indication of the selection of the at least one selectable data element from the filtered group of selectable elements comprises receiving an indication of a selection of a plurality of selectable data elements from the multiple selectable elements.

4. The method of claim 1, wherein a first data item of the plurality of data items received from the first application includes the respective one or more representations of the first data item that are not output for display by the first application.

5. The method of claim 1, wherein the plurality of data items comprises a first plurality of data items, and wherein the method further comprises:

during execution of a third application on the computing device, and responsive to receiving the indication of the first event to initiate the copy operation associated with the system clipboard, sending, to the third application, a request to obtain data associated with one or more graphical elements that are output by the third application for display; and responsive to sending the request to the third application, receiving, from the third application, the data associated with the one or more graphical elements that are output for display by the third application, wherein the data associated with the one or more graphical elements that are output for display by the third application comprises a second plurality of data items, wherein each data item of the second plurality of data items includes one or more representations of the respective data item in the second plurality of data items, and wherein each data item of the second plurality of data items is stored in the system clipboard, wherein during execution of the second application on the computing device, and responsive to receiving the indication of the second event to initiate the paste operation associated with the system clipboard, identifying the filtered group of data items comprises identifying, from both the first plurality of data items and the second plurality of data items, the filtered group of data items.

6. The method of claim 1, wherein the system clipboard is stored on a device external to the computing device.

7. A computer-readable storage medium encoded with instructions that, when executed, cause at least one processor to perform operations comprising:

during execution of a first application, and responsive to receiving an indication of a first event to initiate a copy operation associated with a system clipboard, sending, by an operating system executed by the at least one processor, and to the first application, a request to obtain data associated with one or more graphical elements that are output by the first application for display;

responsive to sending the request to the first application, receiving, by the operating system and from the first application, the data associated with the one or more graphical elements, wherein the data comprises a plurality of data items provided by the first application, wherein each data item of the plurality of data items includes one or more representations of the respective data item, and wherein each data item of the plurality of data items is stored in the system clipboard;

during execution of a second application:

sending, by the operating system and to the second application via an application programming interface, a request to obtain an indication of one or more data types that are supported by the second application for a paste operation; and responsive to sending the request to the second application, receiving, by the operating system and from the second application, the indication of the one or more data types that are supported by the second application for the paste operation;

responsive to receiving an indication of a second event to initiate the paste operation associated with the system clipboard, identifying, by the operating system and from the plurality of data items stored in the system clipboard, a filtered group of data items, wherein each data item in the filtered group of data items includes at least one representation having a respective data type that matches at least one of the one or more data types supported by the second application for the paste operation;

outputting, by the operating system and for display, a filtered list of selectable elements that correspond to the filtered group of data items;

receiving, by the operating system, an indication of a selection of at least one selectable element from the filtered list of selectable elements, wherein the at least one selectable element corresponds to at least one data item included in the filtered group of data items;

retrieving, by the operating system, the at least one data item from the system clipboard; and sending, by the operating system and to the second application, the at least one data item.

8. The computer-readable storage medium of claim 7, wherein each data item of the plurality of data items further includes a textual description of the respective data item, and wherein outputting the filtered group of selectable elements comprises outputting, for each selectable element in the filtered group of selectable elements, the textual description of the respective data item that corresponds to the respective selectable element.

9. The computer-readable storage medium of claim 7, wherein the filtered group of data items comprises multiple data items, wherein the filtered group of selectable elements comprises multiple selectable elements, and wherein receiving the indication of the selection of the at least one selectable data element from the filtered group of selectable elements comprises receiving an indication of a selection of a plurality of selectable data elements from the multiple selectable elements.

10. The computer-readable storage medium of claim 7, wherein the plurality of data items comprises a first plurality of data items, and wherein the operations further comprise:

during execution of a third application on the computing device, and responsive to receiving the indication of the first event to initiate the copy operation associated with the system clipboard, sending, to the third application, a request to obtain data associated with one or more graphical elements that are output by the third application for display; and responsive to sending the request to the third application, receiving, from the third application, the data associated with the one or more graphical elements that are output for display by the third application, wherein the data associated with the one or more graphical elements that are output for display by the third application comprises a second plurality of data items, wherein each data item of the second plurality of data items includes one or more representations of the respective data item in the second plurality of data items, and wherein each data item of the second plurality of data items is stored in the system clipboard;

wherein during execution of the second application on the computing device, and responsive to receiving the indication of the second event to initiate the paste operation associated with the system clipboard, identifying the filtered group of data items comprises identifying, from both the first plurality of data items and the second plurality of data items, the filtered group of data items.

11. A computing device, comprising:

at least one processor;

at least one storage device communicatively coupled to the at least one processor, wherein the at least one storage device is configured to store a system clipboard; and a presence-sensitive display device communicatively coupled to the at least one processor and to the at least one storage device, wherein the at least one processor is configured to:

during execution of a first application, and responsive to receiving an indication of a first event to initiate a copy operation associated with the system clipboard, send, by an operating system executed by the at least one processor, and to the first application, a request to obtain data associated with one or more graphical elements that are output by the first application for display at the presence-sensitive display device;

responsive to sending the request to the first application, receive, by the operating system and from the first application, the data associated with the one or more graphical elements, wherein the data comprises a plurality of data items provided by the first application, wherein each data item of the plurality of data items includes one or more representations of the respective data item, and wherein each data item of the plurality of data items is stored in the system clipboard;

during execution of a second application:

send, by the operating system and to the second application via an application programming interface, a request to obtain an indication of one or more data types that are supported by the second application for a paste operation; and responsive to sending the request to the second application, receive, by the operating system and from the second application, the indication of the one or more data types that are supported by the second application for the paste operation;

responsive to receiving an indication of a second event to initiate the paste operation associated with the system clipboard, identify, by the operating system and from the plurality of data items stored in the system clipboard, a filtered group of data items, wherein each data item in the filtered group of data items includes at least one representation having a respective data type that matches at least one of the one or more data types supported by the second application for the paste operation;

output, by the operating system and for display, a filtered list of selectable elements that correspond to the filtered group of data items;

receive, by the operating system, an indication of a selection of at least one selectable element from the filtered list of selectable elements, wherein the at least one selectable element corresponds to at least one data item included in the filtered group of data items;

retrieve, by the operating system, the at least one data item from the system clipboard; and send, by the operating system and to the second application, the at least one data item for output at the presence-sensitive display device.

12. The computing device of claim 11,
wherein each data item of the plurality of data items further includes a textual description of the respective data item, and
wherein the at least one processor is configured to output the filtered group of selectable elements at least by outputting, for each selectable element in the filtered group of selectable elements, the textual description of the respective data item that corresponds to the respective selectable element.

13. The computing device of claim 11,
wherein the filtered group of data items comprises multiple data items,
wherein the filtered group of selectable elements comprises multiple selectable elements, and
wherein the at least one processor is configured to receive the indication of the selection of the at least one selectable data element from the filtered group of selectable elements at least by receiving an indication of a selection of a plurality of selectable data elements from the multiple selectable elements.

14. The computing device of claim 11, wherein the plurality of data items comprises a first plurality of data items, and wherein the at least one processor is further configured to:

during execution of a third application on the computing device, and responsive to receiving the indication of the first event to initiate the copy operation associated with the system clipboard, send, to the third application, a request to obtain data associated with one or more graphical elements that are output by the third application for display; and responsive to sending the request to the third application, receive, from the third application, the data associated with the one or more graphical elements that are output for display by the third application, wherein the data associated with the one or more graphical elements that are output for display by the third application comprises a second plurality of data items, wherein each data item of the second plurality of data items includes one or more representations of the respective data item in the second plurality of data items, and wherein each data item of the second plurality of data items is stored in the system clipboard, wherein during execution of the second application on the computing device, and responsive to receiving the indication of the second event to initiate the paste operation associated with the system clipboard, the at least one processor is configured to identify the filtered group of data items at least by identifying, from both the first plurality of data items and the second plurality of data items, the filtered group of data items.

\* \* \* \* \*